United States Patent
Yamori

(10) Patent No.: US 9,544,594 B2
(45) Date of Patent: Jan. 10, 2017

(54) MOVING IMAGE REENCODING DEVICE AND MOVING IMAGE REENCODING METHOD

(71) Applicant: FUJITSU LIMITED, Kawasaki-shi, Kanagawa (JP)

(72) Inventor: Akihiro Yamori, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 554 days.

(21) Appl. No.: 13/897,977

(22) Filed: May 20, 2013

(65) Prior Publication Data

US 2014/0044177 A1    Feb. 13, 2014

(30) Foreign Application Priority Data

Aug. 10, 2012   (JP) .................... 2012-179071

(51) Int. Cl.

| | | |
|---|---|---|
| H04L 12/26 | (2006.01) | |
| G10L 21/00 | (2013.01) | |
| H04B 1/66 | (2006.01) | |
| G06F 13/38 | (2006.01) | |
| H04N 19/593 | (2014.01) | |

(Continued)

(52) U.S. Cl.
CPC ...... *H04N 19/00763* (2013.01); *H04N 19/112* (2014.11); *H04N 19/147* (2014.11); *H04N 19/149* (2014.11); *H04N 19/159* (2014.11); *H04N 19/172* (2014.11); *H04N 19/19* (2014.11);

(Continued)

(58) Field of Classification Search
CPC ............... H04N 7/26; H04N 7/32; H04N 7/12
See application file for complete search history.

(56) References Cited

U.S. PATENT DOCUMENTS

2009/0110056 A1    4/2009  Miyaji et al.
2013/0058414 A1*   3/2013  Tsuru ................... H04N 19/176
                                                  375/240.16

FOREIGN PATENT DOCUMENTS

JP    2008-141407    6/2008
JP    2009-49764     5/2009
(Continued)

OTHER PUBLICATIONS

Japanese Office Action dated Jun. 14, 2016 in corresponding Japanese Patent Application No. 2012-179071.

(Continued)

*Primary Examiner* — Sath V Perungavoor
*Assistant Examiner* — Patricia I Young
(74) *Attorney, Agent, or Firm* — Staas & Halsey LLP

(57) ABSTRACT

A moving image reencoding device, includes a processor; and a memory which stores a plurality of instructions, which when executed by the processor, cause the processor to execute, decoding encoded moving image data that is encoded by a first encoding method that enables switching for a frame encoding mode in which encoding is performed on the basis of a frame or a field encoding mode in which encoding is performed on the basis of a field, in a block unit that is obtained by dividing a picture, and acquiring importance degree information related to an importance degree of an encoding mode that is switched in the block unit, when decoding the encoded moving image data; acquiring an encoding parameter that is set as a second encoding method, the second encoding method enabling switching for the frame encoding mode or the field encoding mode in a picture unit, or statistical information.

19 Claims, 21 Drawing Sheets

(51) Int. Cl.
  *H04N 19/159*  (2014.01)
  *H04N 19/147*  (2014.01)
  *H04N 19/172*  (2014.01)
  *H04N 19/149*  (2014.01)
  *H04N 19/112*  (2014.01)
  *H04N 19/19*  (2014.01)
  *H04N 19/40*  (2014.01)
  *H04N 19/70*  (2014.01)
  *H04N 19/61*  (2014.01)

(52) U.S. Cl.
  CPC .............. *H04N 19/40* (2014.11); *H04N 19/61* (2014.11); *H04N 19/70* (2014.11)

(56) References Cited

FOREIGN PATENT DOCUMENTS

| | | |
|---|---|---|
| JP | 2009-111479 | 5/2009 |
| JP | 2009-212608 | 9/2009 |

OTHER PUBLICATIONS

Japanese Office Action dated Feb. 2, 2016 in corresponding Japanese Patent Application No. 2012-179071.

\* cited by examiner

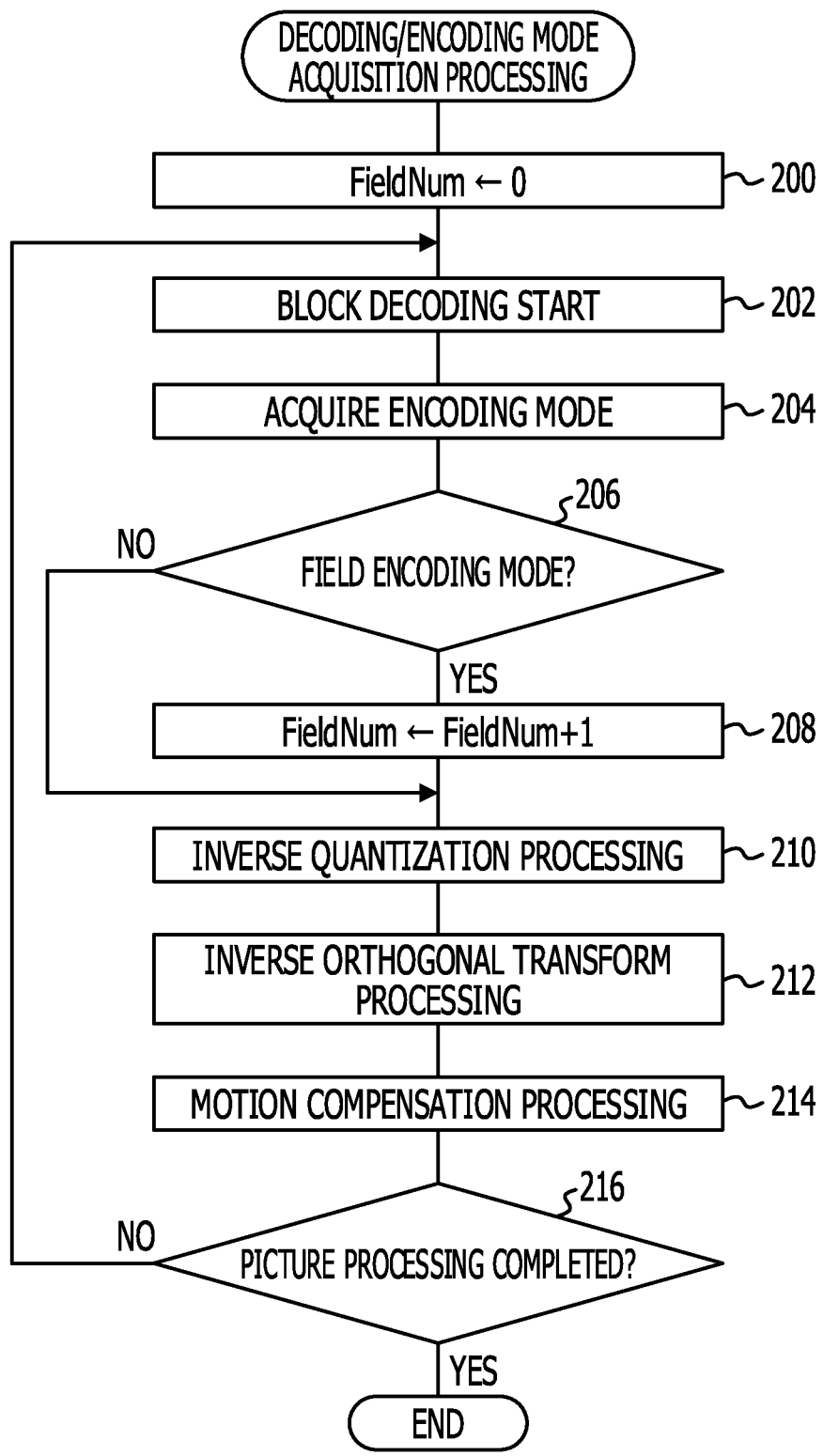

FIG. 3

| macroblock modes(){ | No.of bits | Mnemonic |
|---|---|---|
| macroblock_type | 1-9 | vlclbf |
| if((spatial_temporal_weight_code_flag==1)&& | | |
| (spatial_temporal_weight_code_table_index!='00')){ | | |
| spatial_temporal_weight_code | 2 | uimsbf |
| } | | |
| if(macroblock_motion_forward|| | | |
| macroblock_motion_backward){ | | |
| if(picture_structure=='frame'){ | | |
| if(frame_pred_frame_dct)==0){ | | |
| frame_motion_type | 2 | uimsbf |
| }else{ | | |
| field_motion_type | 2 | uimsbf |
| } | | |
| } | | |
| if((picture_structure=="Frame picture")&& | | |
| (frame_pred_frame_dct)==0)&& | | |
| (macroblock_intra||macroblock_pattern){ | | |
| dct_type | 1 | uimsbf |
| } | | |
| } | | |

FIG. 4
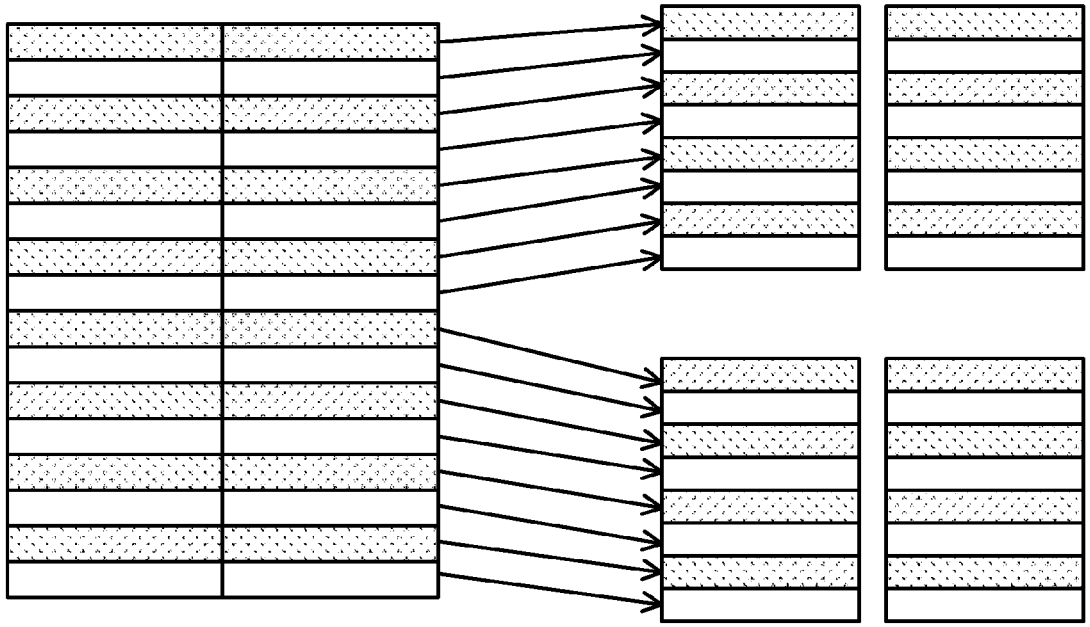
CASE OF TRANSFORM BY FrameDCT
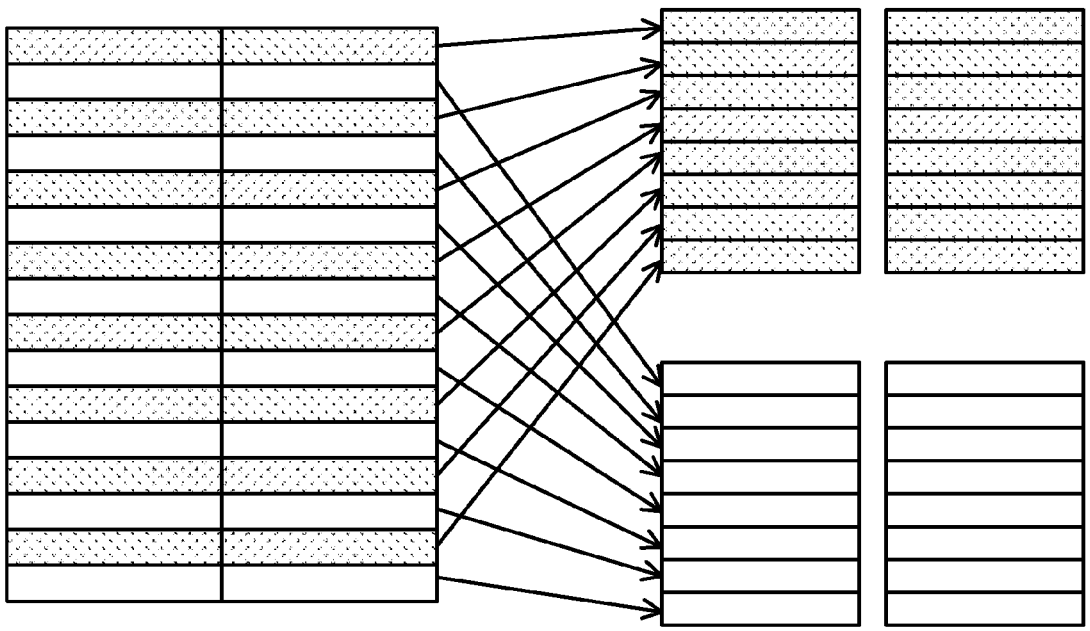
CASE OF TRANSFORM BY FieldDCT

FIG. 5

| CODE | SPATIAL TEMPORAL WEIGHT CLASS | PREDICTION TYPE | MOTION VECTOR COUNT | MV FORMAT | DMV |
|---|---|---|---|---|---|
| 00 | | RESERVED | | | |
| 01 | 0,1 | FIELD-BASED | 2 | FIELD | 0 |
| 01 | 2,3 | FIELD-BASED | 1 | FIELD | 0 |
| 10 | 0,1,2,3 | FRAME-BASED | 1 | FRAME | 0 |
| 11 | 0,2,3 | DUAL-PRIME | 1 | FIELD | 1 |

FIG. 6

| CODE | SPATIAL TEMPORAL WEIGHT CLASS | PREDICTION TYPE | MOTION VECTOR COUNT | MV FORMAT | DMV |
|---|---|---|---|---|---|
| 00 | | RESERVED | | | |
| 01 | 0,1 | FIELD-BASED | 1 | FIELD | 0 |
| 10 | 0,1 | 16x8 MC | 2 | FIELD | 0 |
| 11 | 0 | DUAL-PRIME | 1 | FIELD | 1 |

FIG. 7

| CONDITION | DCT_TYPE |
|---|---|
| picture_structure=="field" | unused because there is no frame/field distinction in a field picture |
| frame_pred_frame_dct==1 | 0("field") |
| !(macroblock_intra\|\|macroblock_pattern) | unused-macroblock is not coded |
| macroblock is skipped | unused-macroblock is not coded |

FIG. 17
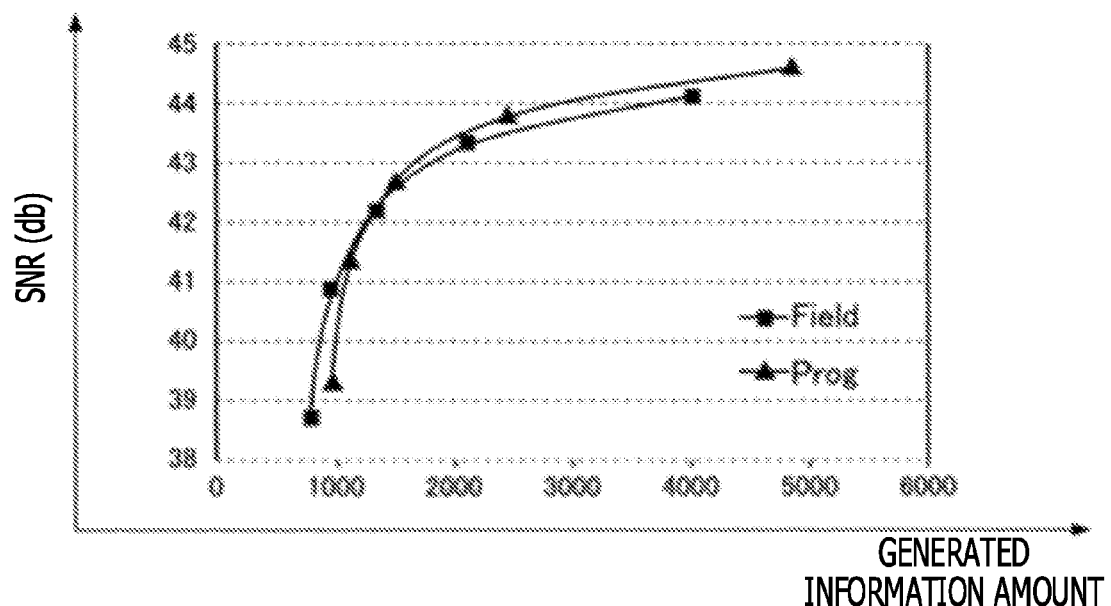
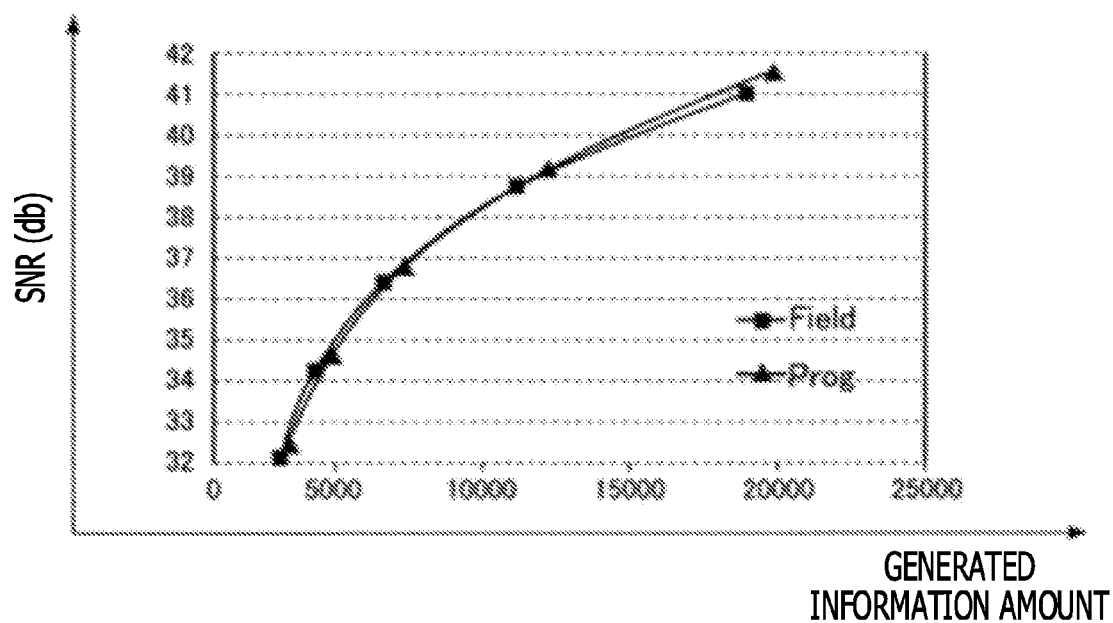

MOVING IMAGE REENCODING DEVICE AND MOVING IMAGE REENCODING METHOD

CROSS-REFERENCE TO RELATED APPLICATION

This application is based upon and claims the benefit of priority of the prior Japanese Patent Application No. 2012-179071, filed on Aug. 10, 2012, the entire contents of which are incorporated herein by reference.

FIELD

The embodiments discussed herein are related to a moving image reencoding device, a moving image reencoding method, and a storage medium which is readable by a computer and stores a moving image reencoding program.

BACKGROUND

As a method for encoding a moving image, moving picture experts group-2 (MPEG-2) which is developed in International Standardization Organization/International Electrotechnical Commission (ISO/IEC) is widely used. Further, H.264/MPEG-4 advanced video coding (H.264/AVC) which is developed in International Telecommunication Union Telecommunication Standardization Sector (ITU-T) which establishes international standards for communication is also widely used.

These encoding methods correspond to progressive video pictures which are obtained by progressive scanning and depicted in FIG. 19 and interlaced video pictures which are obtained by interlaced scanning by every other line and depicted in FIG. 19, as video picture materials. Encoding of a moving image includes frame encoding (progressive encoding) and field encoding depicted in FIG. 20. Encoding is performed by using a video picture which is obtained by taking out all vertical lines of one frame without any gaps in the frame encoding, and encoding is performed by using a video picture which is obtained by taking out every other line of one frame in the field encoding. In the field encoding, there are top field encoding and bottom field encoding depending on a taking position of a video picture.

Here, individual encoding methods support different encoding techniques, so that encoding efficiency differs and calculation amounts of encoding processing and decoding processing differ as well. Accordingly, there is a case where only an encoding method of which a calculation amount is relatively small is supported in a device of which a hardware resource is limited, such as a portable telephone and a portable information terminal. Therefore, a moving image reencoding device (referred to also as a transcoder) which decodes moving image data which has been once encoded by a first encoding method and reencodes the decoded moving image data in accordance with a second encoding method has been developed. For example, in Japanese Laid-open Patent Publication No. 2009-212608, a transcoder that is capable of switching a field encoding mode and a frame encoding mode when reencoding moving image data, which has been encoded in accordance with MPEG-2, in accordance with H.264 MPEG-4 AVC is proposed.

SUMMARY

In accordance with an aspect of the embodiments, a moving image reencoding device, includes a processor; and a memory which stores a plurality of instructions, which when executed by the processor, cause the processor to execute, decoding encoded moving image data that is encoded by a first encoding method that enables switching for a frame encoding mode in which encoding is performed on the basis of a frame or a field encoding mode in which encoding is performed on the basis of a field, in a block unit that is obtained by dividing a picture, and acquiring importance degree information related to an importance degree of an encoding mode that is switched in the block unit, when decoding the encoded moving image data; acquiring an encoding parameter that is set as a second encoding method, the second encoding method enabling switching for the frame encoding mode or the field encoding mode in a picture unit, or statistical information in execution of second encoding with respect to the moving image data that is decoded; determining an encoding mode of the second encoding method on the basis of the importance degree information that is acquired, and the encoding parameter that is acquired or the statistical information that is acquired; and performing the second encoding with respect to the moving image data that is decoded, in accordance with the encoding mode that is determined.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

These and/or other aspects and advantages will become apparent and more readily appreciated from the following description of the embodiments, taken in conjunction with the accompanying drawing of which:

FIG. 2 is a flowchart illustrating decoding/encoding mode acquisition processing in a first embodiment;

FIG. 3 is a table illustrating syntax of a macro block mode in MPEG2;

FIG. 4 illustrates a DCT mode (frame DCT and field DCT) in MPEG2;

FIG. 5 is a table illustrating elements taken by frame_motion_type;

FIG. 6 is a table illustrating elements taken by field_motion_type;

FIG. 7 is a table illustrating elements taken by dct_type;

FIG. 17 illustrates an example of a relation between an encoding generated information amount and a SN ratio for each encoding mode;

DESCRIPTION OF EMBODIMENTS

Figure 21:
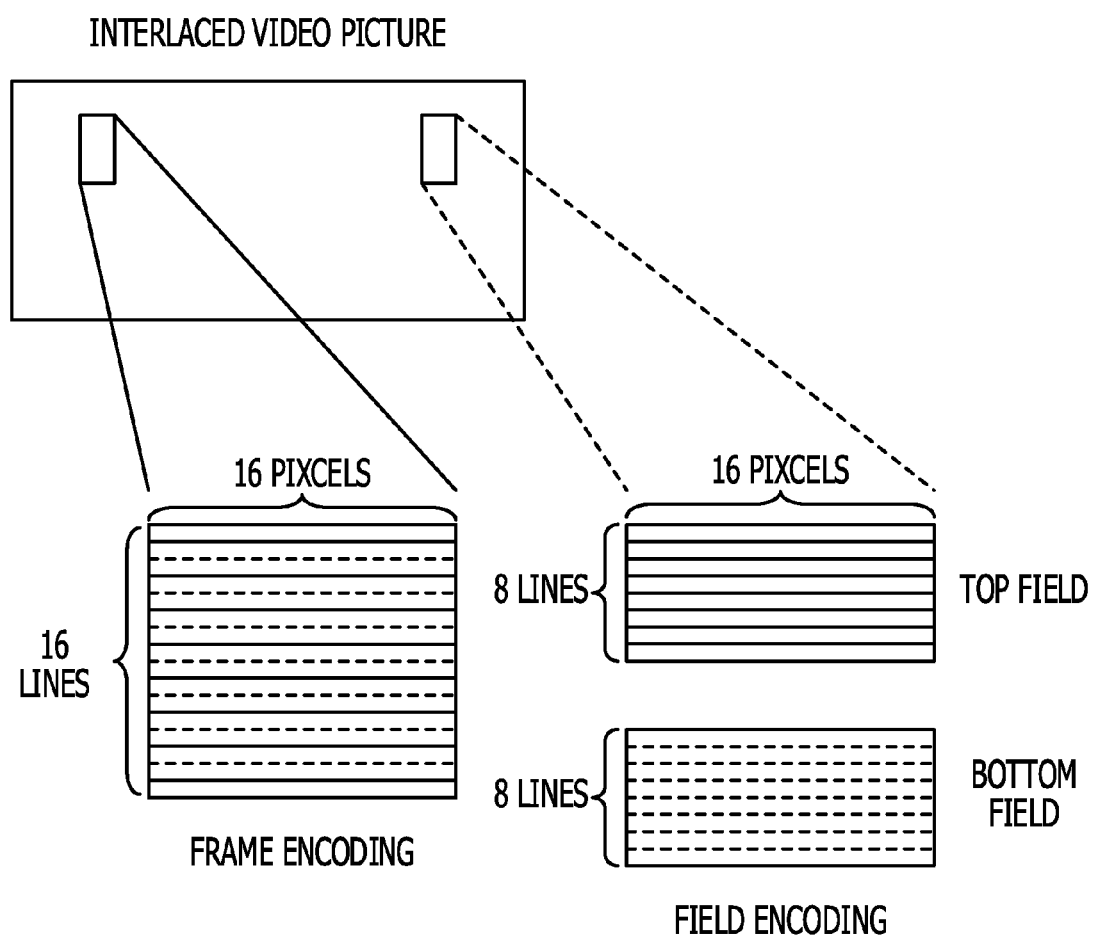
FIG. 21 is a schematic diagram illustrating switching of a field encoding mode and a frame encoding mode in a block unit.

The novel finding which has been obtained through verification of the inventors is described below. As depicted in FIG. 21, it is possible to switch a field encoding mode and a frame encoding mode in an encoding processing block unit in MPEG2. On the other hand, H.264/AVC is an encoding method which enables switching of a field encoding mode and a frame encoding mode in a frame unit and is referred to as a picture adaptive frame field (PAFF). Specifically, MPEG-2 enables switching of a field encoding mode and a frame encoding mode in a unit of an encoding processing block of 16×16 pixels which is called a macro block (MB), and H.264 PAFF enables switching of a field encoding mode and a frame encoding mode in a frame unit.

Here, it is considered that a bit stream which has been encoded in MPEG-2 is reencoded into a bit stream of H.264 PAFF. In reencoding by the PAFF, both of field encoding and frame encoding are performed for every picture until bit stream generation in practice and 2 pass encoding for selecting an efficient encoding mode is performed, consequently maximizing encoding efficiency. However, in the 2 pass encoding, encoding processing is performed twice to select field encoding or frame encoding, causing such problem that a calculation amount becomes to be more than twice as large as a calculation amount of related art. Thus, a calculation amount is large.

An example of embodiments of the present disclosure will be described below with reference to the accompanying drawings. Here, precedential to description of embodiments of techniques of the present disclosure, a comparison example of the disclosed technology is first described.

[Comparison Example]

Figure 16:
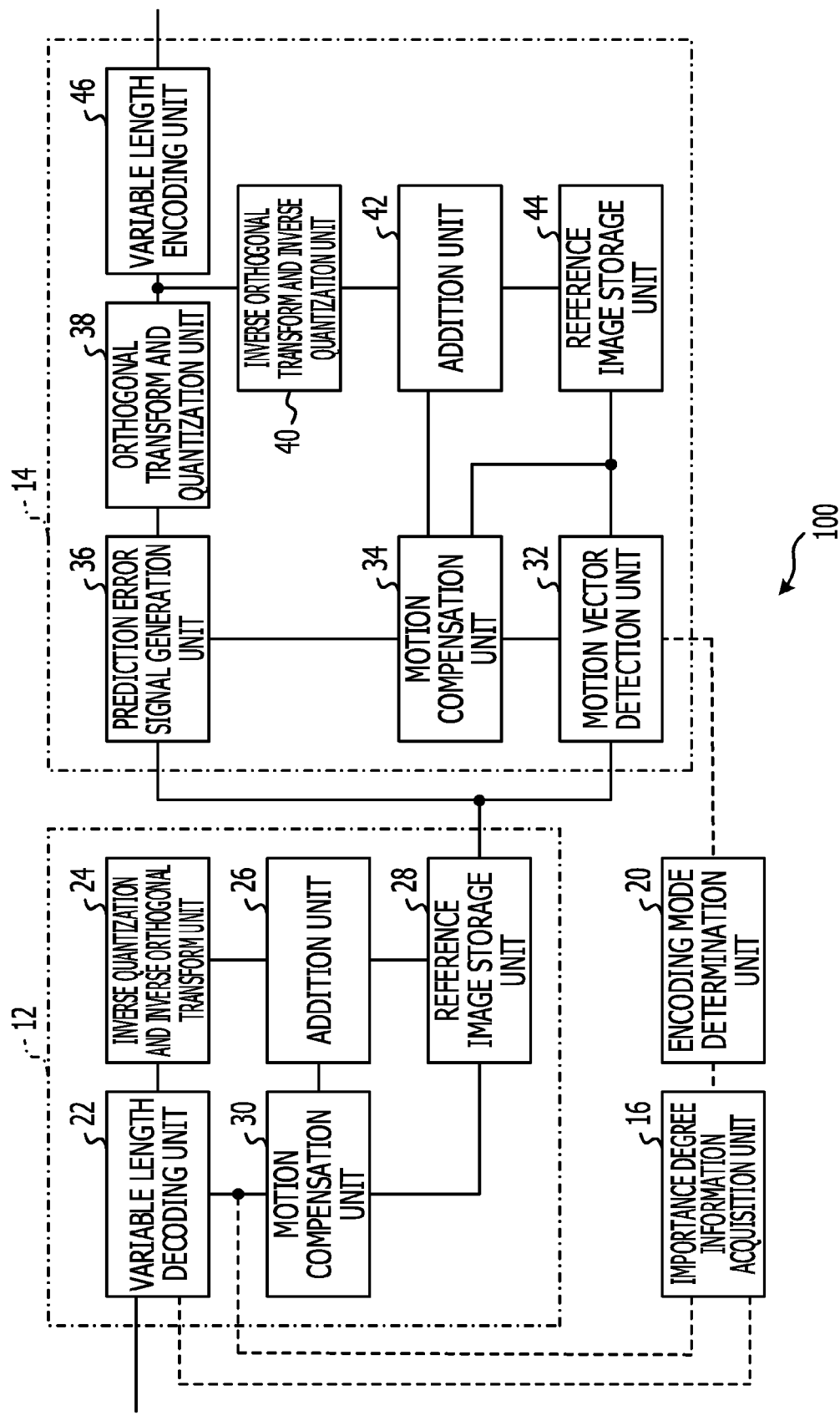
FIG. 16 is a block diagram illustrating the schematic configuration of a moving image reencoding device according to a comparison example.

FIG. 16 illustrates a moving image reencoding device 100 according to a comparison example. The moving image reencoding device 100 includes a decoding unit 12, a reencoding unit 14, an importance degree information acquisition unit 16, and an encoding mode determination unit 20. Respective elements of the moving image reencoding device 100 are formed as independent circuits. Respective elements of the moving image reencoding device 100 may be mounted as one integrated circuit in which circuits corresponding to respective elements are integrated. Further, respective element of the moving image reencoding device 100 may be functional modules which are realized through execution of a computer program performed by a CPU.

The moving image reencoding device 100 acquires a data stream which includes encoded moving image data via a communication network and an interface circuit for connecting the moving image reencoding device 100 to the communication network, for example. The moving image reencoding device 100 stores the acquired data stream in a buffer memory which is not depicted. The moving image reencoding device 100 reads out the encoded moving image data from the buffer memory in an order of encoded pictures and inputs the picture which is read into the decoding unit 12.

The decoding unit 12 decodes the encoded picture and provides the decoded picture to the reencoding unit 14. Further, the decoding unit 12 outputs information indicating whether the encoded picture has been frame-encoded or field-encoded in a macro block unit, to the importance degree information acquisition unit 16. Here, a macro block has the size of 16×16 pixels, for example, but a macro block may have the size larger than the size of 16×16 pixels or may have the size smaller than the size of 16×16 pixels.

The decoding unit 12 includes a variable length decoding unit 22, an inverse quantization and inverse orthogonal transform unit 24, an addition unit 26, a reference image storage unit 28, and a motion compensation unit 30.

The variable length decoding unit 22 variable-length-decodes an input bit stream, which is inputted, into moving image data which is variable-length-encoded in a macro block (MB) unit. Here, as a variable-length-encoding method, a Huffman coding method such as context-based adaptive variable length coding (CAVLC) or an arithmetic coding method such as context-based adaptive binary arithmetic coding (CABAC), for example, is applied. The variable length decoding unit 22 reproduces a quantized signal which is a quantized prediction error signal. Further, when a focused macro block is inter-coded, the variable length decoding unit 22 variable-length-decodes a motion vector of the macro block. Here, inter-coding represents an encoding method in which a focused picture is encoded by using correlativity among the focused picture and previous and following pictures of the focused picture. Then, the variable length decoding unit 22 outputs the reproduced motion vector to the motion compensation unit 30 and outputs the quantized signal to the inverse quantization and inverse orthogonal transform unit 24.

Further, the variable length decoding unit 22 extracts variable types of information which are used for decoding, such as information indicating a prediction mode which is applied to a macro block which is intra-prediction-coded or inter-prediction-coded, from header information which is included in encoded moving image data. Then, the variable length decoding unit 22 notifies the motion compensation unit 30 of the prediction mode.

When inputted moving image data has been encoded in accordance with MPEG-2, the variable length decoding unit 22 refers to three kinds of flags which are frame motion type, field motion type, and dct type, as encoding mode information so as to specify an encoding mode. For example, the variable length decoding unit 22 determines that a macro block to which field motion type is prescribed has been field-encoded. Further, when a code value of frame motion type is "10", the variable length decoding unit 22 determines that a macro block which corresponds to the frame motion type has been frame-encoded.

On the other hand, when a code value of frame motion type is a value other than "10", the variable length decoding unit 22 determines that a macro block which corresponds to the frame motion type has been field-encoded. Further, when a value of dct type is "1", the variable length decoding unit 22 determines that a macro block which corresponds to the dct type has been field-encoded, and when a value of dct type is "0", the variable length decoding unit 22 determines that a macro block which corresponds to the dct type has been frame-encoded. The variable length decoding unit 22 outputs information indicating whether each macro block is frame-encoded or field-encoded to the importance degree information acquisition unit 16.

The inverse quantization and inverse orthogonal transform unit 24 multiplies the quantized signal which is inputted from the variable length decoding unit 22 by a predetermined number corresponding to the quantization width, which is decided on the basis of a quantization parameter acquired from the header information which is included in the encoded moving image data, so as to inversely quantize the quantized signal. Through this inverse quantization, a frequency signal of a focused macro block is restored. A frequency signal is a pair of coefficients which is obtained by orthogonal transform processing, which is executed with respect to a macro block by the moving image encoding device which has encoded inputted moving image data, and represents the intensity of every frequency component, for example. When discrete cosine transform (DCT) is used as the orthogonal transform processing, for example, a pair of DCT coefficients is obtained by inversely quantizing a quantized signal. Further, when Hadamard transform is used as the orthogonal transform processing, a pair of Hadamard coefficients is restored by inversely quantizing a quantized signal.

Subsequently, the inverse quantization and inverse orthogonal transform unit 24 performs inverse orthogonal transform processing with respect to the frequency signal. This inverse orthogonal transform processing is inverse transform of the orthogonal transform processing which is executed to a macro block. The inverse quantization processing and the inverse orthogonal transform processing are executed with respect to a quantized signal, reproducing a prediction error signal. The inverse quantization and inverse orthogonal transform unit 24 outputs a prediction error signal which is reproduced for every macro block to the addition unit 26.

The addition unit 26 adds a reproduced prediction error signal corresponding to a pixel to each pixel value of a prediction image which is inputted from the motion compensation unit 30 for every macro block, so as to reproduce a macro block. Then, the addition unit 26 bonds reproduced macro blocks in accordance with an encoding order so as to reproduce a picture. The addition unit 26 stores the reproduced picture in the reference image storage unit 28.

The reference image storage unit 28 includes a frame memory, for example. The reference image storage unit 28 temporarily stores a picture which is inputted from the addition unit 26. Further, the reference image storage unit 28 supplies the motion compensation unit 30 with a picture as a reference image. Respective pictures which are stored in the reference image storage unit 28 are read out after being rearranged in a temporal order, for example, so as to be outputted to the reencoding unit 14. Here, when an encoding order of respective pictures in inputted moving image data may be same as an encoding order of respective pictures for reencoding, the decoding unit 12 may output respective pictures in a reproduction order.

The motion compensation unit 30 generates a prediction image in accordance with a prediction mode which is extracted from the header information, for every macro block which is prediction-coded. The motion compensation unit 30 reads a reference image which has been used in encoding of a focused macro block, from the reference image storage unit 28. The motion compensation unit 30 compensates motion of a reference image by using a motion vector so as to generate a prediction image, when an applied prediction mode is any one of prediction modes of inter-coding, such as a forward prediction mode and a backward prediction mode. A motion vector represents a spatial moving amount between a focused macro block and a reference image which is most similar to the macro block. Further, motion compensation is processing for moving a position of a block on the most similar reference image so as to cancel an amount, which is represented by a motion vector, of displacement on the reference image between a macro block and a block on the reference image most similar to the macro block.

When a focused macro block is frame-encoded, the motion compensation unit 30 performs motion compensation of a reference image by using a motion vector which is obtained with respect to a macro block which is set with respect to a frame. On the other hand, when a focused macro block is field-encoded, the motion compensation unit 30 performs motion compensation of a reference image for each field by using both of a motion vector which is obtained with respect to a top field and a motion vector which is obtained with respect to a bottom field. Further, when an applied prediction mode is a prediction mode for intra-coding of which a reference destination is a macro block, which has already been encoded, in a picture, the motion compensation unit 30 generates a prediction image from a reference image in accordance with the applied prediction mode in the intra-coding modes. The motion compensation unit 30 outputs the generated prediction image to the addition unit 26.

As described above, the importance degree information acquisition unit 16 acquires information (encoding mode) indicating whether a macro block is frame-encoded or field-encoded, on the basis of a result of variable length decoding from the variable length decoding unit 22 in a macro block unit and counts the result. Further, the importance degree information acquisition unit 16 acquires a generated information amount for each encoding mode and dispersion of motion vectors for each encoding mode, from the variable length decoding unit 22 in a macro block unit. The encoding mode determination unit 20 determines an encoding mode, which is to be applied in reencoding, from the frame encoding mode and the field encoding mode, on the basis of the information acquired by the importance degree information acquisition unit 16, for every reencoding unit complying with the PAFF method.

Here, a reencoding unit may be a unit of individual slices obtained by dividing a frame into a plurality of slices, a frame unit, or a group of pictures (GOP) unit, for example. Each slice is set to include a plurality of macro blocks. For example, a frame is divided into a slice including an upper half of the frame and a slice including a lower half of the frame. Alternatively, a reencoding unit may be a reorder unit corresponding to a pair of frames of which orders are switched in inter-coding.

More specifically, the encoding mode determination unit 20 determines an encoding mode on the basis of whether or not conditions of the following formulas (1) to (3) are satisfied.

$$\text{FieldNum} \geq TH1 \qquad (1)$$

In the above formula (1), FieldNum denotes the number, which is obtained by the importance degree information acquisition unit 16, of field-encoded blocks in a block unit of the decoding unit 12, and TH1 denotes a determination threshold value.

$$\text{FieldInfo} \geq \text{FrameInfo} \times TH2 \qquad (2)$$

In the above formula (2), FieldInfo denotes a cumulative generated information amount in a field-encoded block which is obtained by the importance degree information acquisition unit 16, FrameInfo denotes a cumulative generated information amount in a frame-encoded block which is obtained by the importance degree information acquisition unit 16, and TH2 denotes a determination threshold value.

$$\text{AveFieldMV}x \geq \text{AveFrameMV}x \times TH3 \qquad (3)$$

In the above formula (3), AveFieldMVx denotes an average of horizontal components of respective motion vectors in a field-encoded block which is obtained by the importance degree information acquisition unit 16. AveFrameMVx denotes an average of respective motion vectors in a frame-encoded block which is obtained by the importance degree information acquisition unit 16, and TH3 denotes a determination threshold value. When any of the conditions of the formulas (1) to (3) is satisfied, the encoding mode determination unit 20 determines encoding performed in the reencoding unit 14 as a field encoding mode. When none of the conditions of the formulas (1) to (3) is satisfied, the encoding mode determination unit 20 determines encoding performed in the reencoding unit 14 as a frame encoding mode.

The reencoding unit 14 reencodes decoded moving image data in accordance with the PAFF method. The reencoding unit 14 includes a motion vector detection unit 32, a motion compensation unit 34, a prediction error signal generation unit 36, an orthogonal transform and quantization unit 38, an inverse orthogonal transform and inverse quantization unit 40, an addition unit 42, a reference image storage unit 44, and a variable length encoding unit 46.

The motion vector detection unit 32 detects a motion vector by using an inputted macro block and a reference image, so as to generate a prediction image for inter-coding. When the motion vector detection unit 32 is notified of application of a frame encoding mode by the encoding mode determination unit 20, the motion vector detection unit 32 detects a motion vector for each macro block which is generated from a frame. On the other hand, when the motion vector detection unit 32 is notified of application of a field encoding mode by the encoding mode determination unit 20, the motion vector detection unit 32 detects a motion vector for each macro block which is generated from a top field and for each macro block which is generated from a bottom field.

The motion vector detection unit 32 executes block matching between an inputted macro block and a reference image so as to decide a reference image which matches best the inputted macro block and a position on a picture including the reference image. Specifically, in block matching, motion search is performed by calculating a difference absolute value sum cumulative value between respective pixels of a macro block of an original image and a macro block cut out of a reference image, so as to search the minimum value, for example, thus searching an optimum motion vector. Here, in a case of a macro block of 16×16 pixels, a difference absolute value sum cumulative value is a value obtained by accumulating difference absolute values of respective pixels of 256 pixels which are from upper left to lower right.

Here, in motion search, not only a difference absolute value sum of pixels but also an evaluation value of a motion vector is generally added. In encoding of a motion vector, not a component but a difference vector with respect to motion vectors of surrounding macro blocks is encoded, so that a difference vector is obtained and an evaluation value corresponding to a motion vector encode length is outputted depending on the size of a component of the difference vector. The motion vector detection unit 32 is capable of finding out a position of a motion vector by which an evaluation value cost, which is expressed at the following formula (4), for example, in motion search becomes to have the minimum value.

$$\text{cost} = \text{SAD\_cost} + \text{MV\_cost} \qquad (4)$$

In the formula (4), SAD_cost (sum absolute difference) denotes a difference absolute value and MV_cost (motion vector) denotes an evaluation value corresponding to an encode amount of a motion vector.

SAD( ) is expressed for obtaining a pixel difference absolute value sum in a macro block. In this case, a difference absolute value sum of 16×16 pixels between a macro block of an original image and a macro block of a reference image is obtained.

$$\text{SAD}( ) = \Sigma|*\text{org} - *\text{ref}|$$

One macro block is possible to be divided into a plurality of sub blocks in practice. Therefore, in a case where a macro block is divided into four sub blocks of 8×8 pixels, for example, a party of four difference absolute value sums of 8×8=64 pixels is a SAD evaluation value. A sub block may have various sizes such as 8×16 pixels, 16×8 pixels, 4×8 pixels, 8×4 pixels, and 4×4 pixels as well as 16×16 pixels or 8×8 pixels.

In a case of an intra macro block, not a difference image but an original image is encoded, so that another evaluation value which is activity ACT( ) is used. A macro block of an original image is orthogonally transformed in a case of an intra macro block, so that activity ACT( ) is obtained on the basis of a gap from an average value (=AveMB) of each pixel of a macro block, for example.

$$\text{ACT}( ) = \Sigma|*\text{org} - \text{AveMB}|$$

Regarding an evaluation value MV_cost, an evaluation value proportional to an encode amount of a motion vector is outputted. Specifically, in encoding of a motion vector, not a component but a difference vector with respect to motion vectors of surrounding macro blocks is encoded, so that an evaluation value is decided depending on the size of an absolute value of the difference vector. An influence degree with respect to the whole cost evaluation value of the evaluation value MV_cost is commonly changed by using a weighting constant $\lambda$.

The motion vector detection unit 32 detects a motion vector whose elements are a position, on a picture, of an inputted macro block, moving amounts in a horizontal direction and a vertical direction with respect to a reference image which matches best the macro block, and identification information indicating a picture to which the reference image belongs. The motion vector detection unit 32 outputs the detected motion vector to the motion compensation unit 34 and the variable length encoding unit 46.

The motion compensation unit 34 decides a prediction mode which defines a generating method of a prediction image with respect to an inputted macro block. The motion compensation unit 34 decides a prediction mode of a macro block on the basis of information which is acquired from the decoding unit 12 and indicates a type of a picture, which is an encoding object and includes the inputted macro block, for example. When a type of a picture which is an encoding object is an I picture, the motion compensation unit 34 selects an intra-coding mode as a prediction mode to be applied.

Further, when a type of a picture which is an encoding object is a P picture, the motion compensation unit 34 selects either of an inter-coding mode or an intra-coding mode as a prediction mode to be applied, for example. Here, whether the inter-coding mode is a forward prediction mode in which a temporally-previous picture is referred or a backward prediction mode in which a temporally-following picture is referred is decided on the basis of information indicating a position of a picture, which is an encoding object, in a group of pictures (GOP).

Further, when a type of a picture which is an encoding object is a B picture, the motion compensation unit 34 selects a prediction mode to be applied among an intra-coding mode, a forward prediction mode, a backward prediction mode, and a bidirectional prediction mode.

When selecting one prediction mode from a plurality of prediction modes, the motion compensation unit 34 calculates a cost which is an evaluation value of an encoded data amount of a macro block for each of the prediction modes. Then, the motion compensation unit 34 sets a prediction mode of which the cost is minimum as a prediction mode to be applied to an inputted macro block. A cost with respect to each prediction mode is calculated as the following formula (5), for example.

$$costf = \sum_{i,j} |org_{i,j} - ref_{i,j}| + \lambda * (\text{Table}[mv1 - premv1]) \quad (5)$$

$$costb = \sum_{i,j} |org_{i,j} - ref_{i,j}| + \lambda * (\text{Table}[mv1 - premv1])$$

$$costbi = \sum_{i,j} |org_{i,j} - ref_{i,j}| + \lambda * \left( \begin{array}{c} \text{Table}[mv1 - premv1] + \\ \text{Table}[mv2 - premv2] \end{array} \right)$$

$$costi = \sum_{i,j} |org_{i,j} - AveMB|$$

Here, costf, costb, costbi, and costi are costs respectively corresponding to the forward prediction mode, the backward prediction mode, the bidirectional prediction mode, and the intra-coding mode. org$_{i,j}$ denotes a value of a pixel on a horizontal direction coordinate i and a vertical direction coordinate j which is included in an inputted macro block. Further, ref$_{i,j}$ denotes a value of a pixel on a horizontal direction coordinate i and a vertical direction coordinate j which is included in a prediction image. Here, the motion compensation unit 34 generates a prediction image from a reference image. Further, mv1 and mv2 denote motion vectors with respect to an inputted macro block, and premv1 and premv2 denote motion vectors of a macro block which has been encoded most recently. Further, Table[a,b] outputs an estimation encode amount corresponding to a difference vector between a vector a and a vector b. For example, Table[a,b] may be a reference table representing estimation encode amounts with respect to various difference vectors. Further, λ denotes a weighting constant and is set to 1, for example. AveMB denotes an average value of pixel values of pixels included in an inputted macro block. Regarding motion prediction, when a direct mode in which a motion vector of a macro block of a focused picture is predicted from motion vectors of previous and following pictures of the focused picture is applicable, the motion compensation unit 34 may calculate a cost of the direct mode.

As described above, there is a case where a macro block is divided into a plurality of blocks and motion vectors are obtained for respective individual blocks. In this case, the motion compensation unit 34 performs calculation of the formula (5) for each of the individual blocks regarding the forward prediction mode, the backward prediction mode, and the bidirectional prediction mode, and sets a sum of the obtained costs of respective blocks as a cost of the corresponding mode. The motion compensation unit 34 calculates a cost of each prediction mode which is a selection object, in accordance with the formula (5). Then, the motion compensation unit 34 selects a prediction mode in which the cost is minimum as a prediction mode which is applied to an inputted macro block.

Further, the motion compensation unit 34 generates a prediction image in accordance with the selected prediction mode. When an inputted macro block is inter-coded in the forward prediction mode and the backward prediction mode, the motion compensation unit 34 motion-compensates a reference image which is obtained from the reference image storage unit 44, on the basis of a motion vector which is provided from the motion vector detection unit 32. Then, the motion compensation unit 34 generates a prediction image, which is motion-compensated, for inter-coding in a macro block unit. Here, when a macro block is encoded in the frame encoding mode, a reference image is generated from a frame. On the other hand, when a macro block is encoded in the field encoding mode, a reference image is generated from a top field or a bottom field.

When an inputted macro block is inter-coded in the bidirectional prediction mode, the motion compensation unit 34 performs motion compensation with respect to a reference image which is specified by each of two motion vectors, by the corresponding motion vector. Then, the motion compensation unit 34 averages pixel values of corresponding pixels between two compensation images which are obtained through the motion compensation, so as to generate a prediction image. When an inputted macro block is intra-prediction-coded, the motion compensation unit 34 generates a prediction image from macro blocks adjacent to the inputted macro block. In this case, the motion compensation unit 34 generates a prediction image in accordance with a horizontal mode, a DC mode, a plane mode, or the like which are defined in H.264 MPEG-4 AVC, for example. The motion compensation unit 34 outputs the generated prediction image to the prediction error signal generation unit 36.

The prediction error signal generation unit 36 executes difference calculation between an inputted macro block and a prediction image which is generated by the motion compensation unit 34. Further, the prediction error signal generation unit 36 sets a difference value which is obtained by the difference calculation and corresponds to each pixel in a macro block, as a prediction error signal. Here, when a frame encoding mode is applied, each macro block is obtained by dividing a frame. On the other hand, when a field encoding mode is applied, each macro block is obtained by dividing a top field or a bottom field. Accordingly, in this case, a prediction error signal is also generated for each of the top field and the bottom field. The prediction error signal generation unit 36 outputs a prediction error signal to the orthogonal transform and quantization unit 38.

The orthogonal transform and quantization unit 38 orthogonally transforms a prediction error signal of an inputted macro block so as to obtain a frequency signal which represents a frequency component in a horizontal direction and a frequency component in a vertical direction of the prediction error signal. For example, the orthogonal transform and quantization unit 38 executes DCT as orthogonal transform processing with respect to a prediction error signal, so as to obtain a pair of DCT coefficients for every macro block as a frequency signal. Alternatively, the orthogonal transform and quantization unit 38 may execute Hadamard transform as orthogonal transform processing with respect to a prediction error signal, so as to obtain a pair of Hadamard coefficients for every macro block as a frequency signal.

Subsequently, the orthogonal transform and quantization unit 38 performs quantization processing with respect to a frequency signal. The quantization processing is processing in which a signal value included in a certain interval is expressed by one signal value. Further, the certain interval is called a quantization width. For example, the orthogonal transform and quantization unit 38 rounds down the predetermined number of lower bits corresponding to the quantization width from a frequency signal, thus performing the quantization processing with respect to the frequency signal. The quantization width is decided on the basis of a quantization parameter. For example, the orthogonal transform and quantization unit 38 decides a quantization width to be used, in accordance with a function expressing a value of the quantization width with respect to a value of a quantization parameter. Further, the function may be a monotonically increasing function with respect to a value of a quantization parameter and may be predetermined.

Alternatively, a plurality of quantization matrixes for specifying the quantization width corresponding to each of frequency components in the horizontal direction and the vertical direction are prepared so as to be stored in a memory included in the orthogonal transform and quantization unit 38. Then, the orthogonal transform and quantization unit 38 selects a specific quantization matrix among the quantization matrixes in accordance with the quantization parameter. The orthogonal transform and quantization unit 38 may refer to the selected quantization matrix so as to decide the quantization width with respect to each frequency component of a frequency signal.

Further, the orthogonal transform and quantization unit 38 may decide a quantization parameter in accordance with any of various quantization parameter deciding methods which correspond to the moving image encoding standards such as MPEG-2, MPEG-4, and H.264 MPEG-4 AVC. The orthogonal transform and quantization unit 38 may employ a method of calculation of a quantization parameter related to a standard test model 5 of MPEG-2, for example. Here, the method of calculation of a quantization parameter related to the standard test model 5 of MPEG-2 is disclosed at a URL specified by http://www.mpeg.org/MPEG/MSSG/tm5/Ch10/Ch10.html, for example.

Thus, the orthogonal transform and quantization unit 38 executes the quantization processing, being able to reduce the number of bits which are used for expressing each frequency component of a frequency signal and reduce an amount of information included in an inputted macro block. The orthogonal transform and quantization unit 38 outputs a quantized signal to the variable length encoding unit 46 and the inverse orthogonal transform and inverse quantization unit 40.

The inverse orthogonal transform and inverse quantization unit 40 and the addition unit 42 reproduce a macro block which has been once encoded, so as to generate a reference image which is referred to encode a following macro block in a picture or a picture following a picture in which the macro block is included.

The inverse orthogonal transform and inverse quantization unit 40 multiplies a quantized signal which is inputted from the orthogonal transform and quantization unit 38 by a predetermined number corresponding to a quantization width which is decided on the basis of a quantization parameter, so as to inversely quantize the quantized signal. Through this inverse quantization, a frequency signal of an inputted macro block, such as a pair of DCT coefficients is restored. Subsequently, the inverse orthogonal transform and inverse quantization unit 40 performs inverse orthogonal transform processing with respect to the frequency signal. For example, when the orthogonal transform and quantization unit 38 performs DCT processing, the inverse orthogonal transform and inverse quantization unit 40 executes inverse DCT processing with respect to an inversely-quantized signal. By executing the inverse quantization processing and the inverse orthogonal transform processing with respect to a quantized signal, a prediction error signal including information approximately equal to a prediction error signal before encoding is reproduced. Then, the inverse orthogonal transform and inverse quantization unit 40 outputs the reproduced prediction error signal for each macro block to the addition unit 42.

The addition unit 42 adds a reproduced prediction error signal corresponding to each pixel to each pixel value of a prediction image for every macro block, so as to reproduce each macro block. Then, the addition unit 42 bonds reproduced macro blocks in an encoding order of the macro blocks, so as to generate a reference image. The addition unit 42 stores the reference image in the reference image storage unit 44. The reference image storage unit 44 includes a frame memory, for example. The reference image storage unit 44 temporarily stores the reference image which is inputted from the addition unit 42. Further, the reference image storage unit 44 supplies the reference image to the motion vector detection unit 32 and the motion compensation unit 34.

The variable length encoding unit 46 variable-length-encodes a quantized frequency signal which is inputted from the orthogonal transform and quantization unit 38 and a motion vector which is received from the vector detection unit 32 so as to generate an encoded signal of which the data amount is compressed. Accordingly, the variable length encoding unit 46 may use Huffman coding processing such as CAVLC or arithmetic coding processing such as CABAC, for example, with respect to a quantized frequency signal.

The moving image reencoding device 100 adds predetermined information including a prediction mode of each macro block and the like, as header information, with respect to an encoded signal which is generated by the variable length encoding unit 46, so as to generate a data stream including encoded moving image data. The moving image reencoding unit 100 stores the data stream in a magnetic recording medium, an optical recording medium, or a storage unit (not depicted) including a semiconductor memory or the like, or outputs the data stream to other devices.

As described above, in this comparison example, the encoding mode determination unit 20 determines whether an encoding mode of reencoding is a field encoding mode or a frame encoding mode on the basis of whether or not the above-mentioned conditions of the formulas (1) to (3) are satisfied. However, if a compression rate (reencoding bit rate) of reencoding is changed in practice, efficiency of frame encoding (fixed) and efficiency of field encoding (fixed) may be reversed as depicted in FIG. 17. In this case, as a bit rate is lowered, encoding efficiency of the field encoding mode becomes higher. Namely, a compression rate of reencoding is not taken into account in the determination of the above formulas (1) to (3). Therefore, when a bit rate of reencoding is changed, especially, when reencoding is performed at a very low bit rate, an encoding mode may be erroneously selected and encoding efficiency may be degraded.

Figure 18:
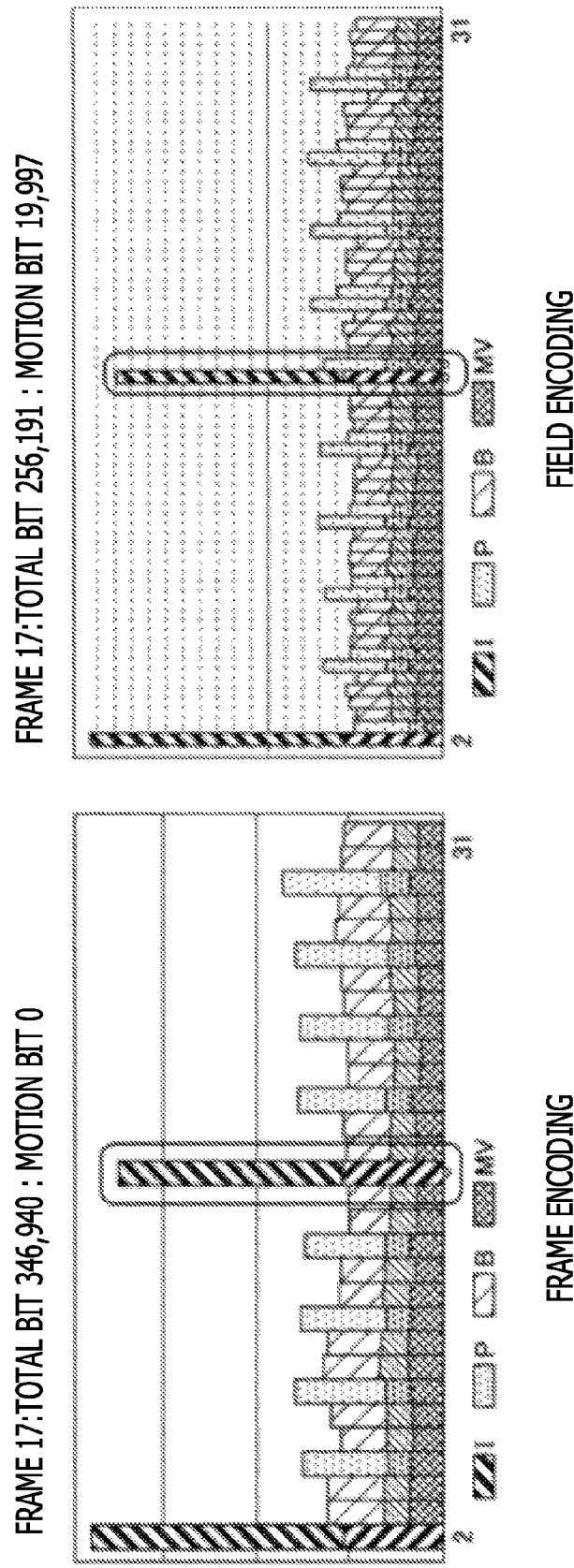
FIG. 18 illustrates an example of a rate of an I picture for each encoding mode.
Figure 19:
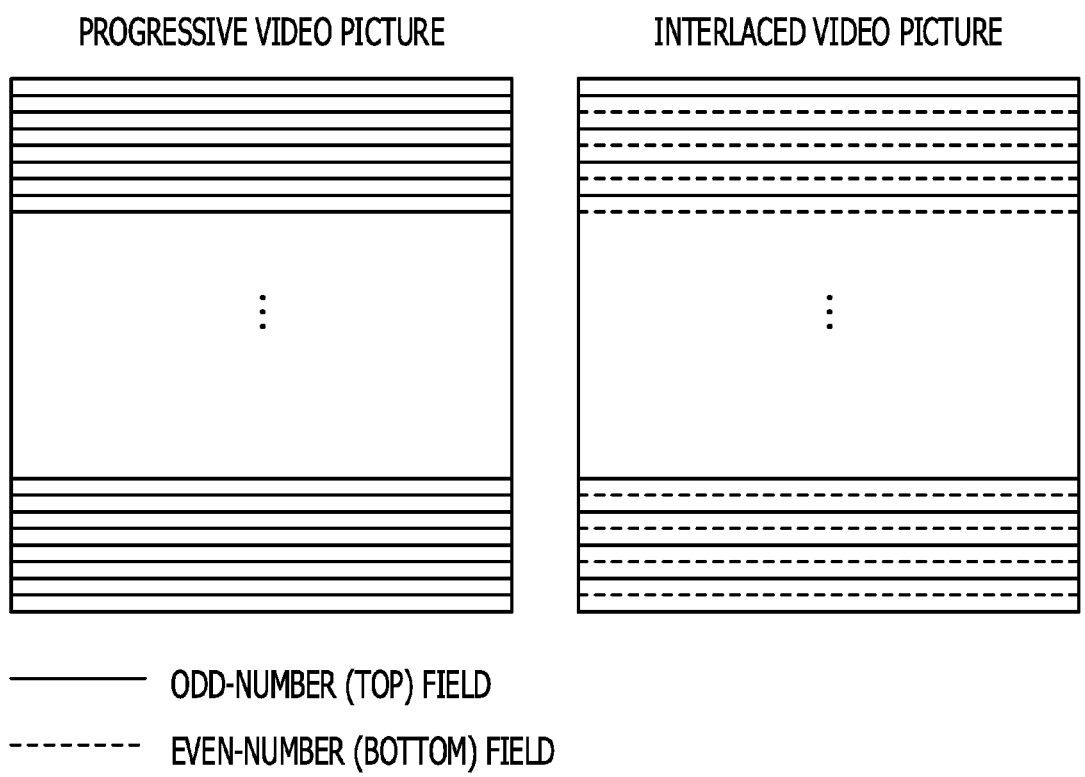
FIG. 19 is a schematic diagram illustrating each of a progressive video picture and an interlaced video picture.
Figure 20:
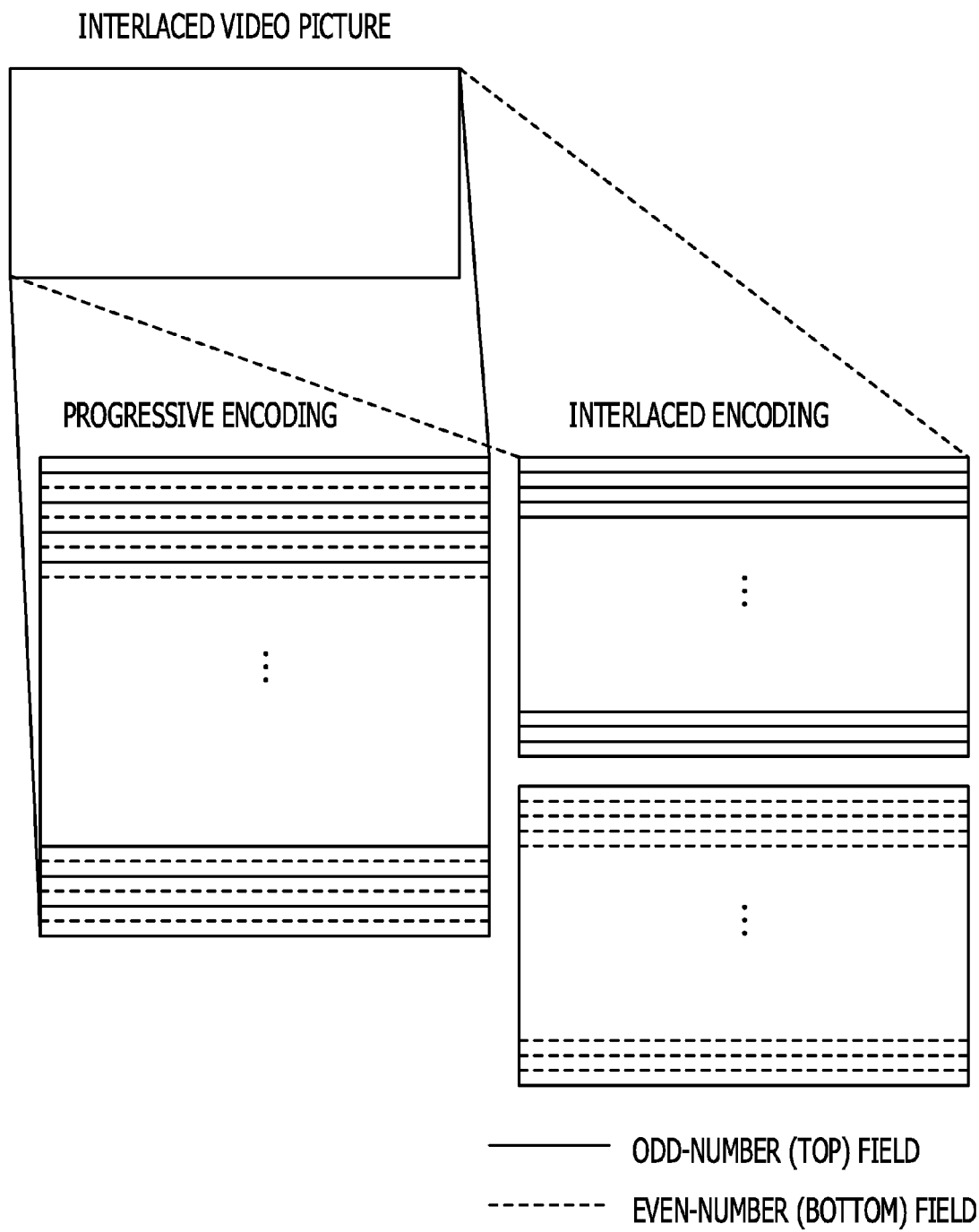
FIG. 20 is a schematic diagram illustrating each of progressive encoding and interlaced encoding.

It may be considered that a reason why encoding efficiency of the field encoding mode becomes higher as the bit rate is lowered is difference of an amount of information of an I picture in each encoding mode, as depicted in FIG. 18. That is, when it is assumed that an I picture exists in an identical group of picture (GOP) cycle, one frame is used for an I picture per GOP cycle in the frame encoding mode, but one field is used for an I picture per GOP cycle in the field encoding mode. One frame equals to two fields, so that the number of I pictures in the field encoding is half of that in the frame encoding. Further, an I picture has low encoding efficiency. Accordingly, the field encoding mode in which a rate of I pictures is decreased as the bit rate is lowered is more advantageous on the point of encoding efficiency.

[First Embodiment]

A technique of a first embodiment of the present disclosure is now described. In the first embodiment, elements same as those of the above-described comparison example are given the same reference characters and description thereof is omitted.

Figure 1:
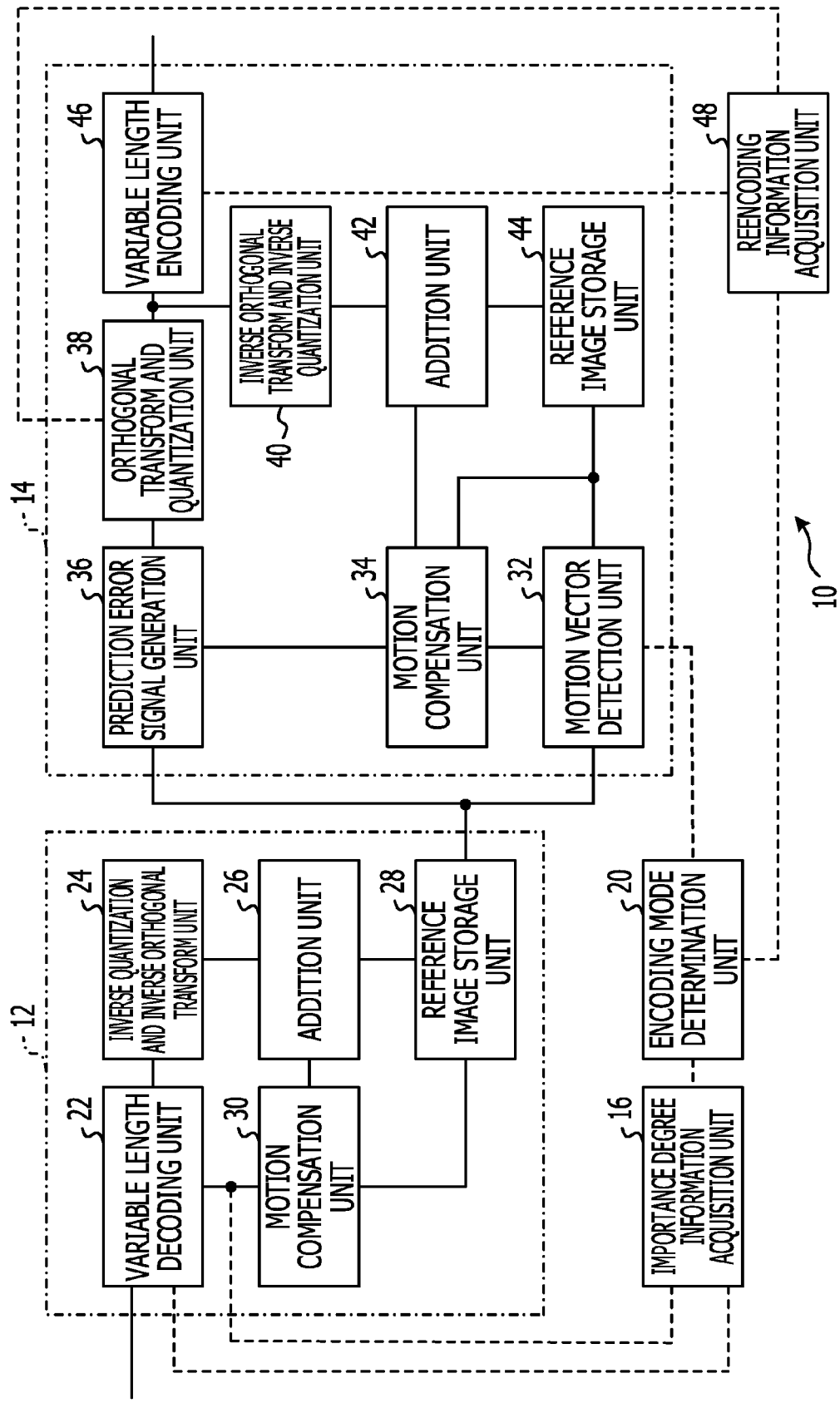
FIG. 1 is a block diagram illustrating the schematic configuration of a moving image reencoding device according to embodiments.

FIG. 1 illustrates a moving image reencoding device 10 according to the first embodiment. The moving image reencoding device 10 according to the first embodiment differs from the moving image reencoding device 100 according to the above-described comparison example in that the moving image reencoding device 10 is provided with a reencoding information acquisition unit 48. In the first embodiment, the reencoding information acquisition unit 48 acquires an encoding bit rate (an amount of information which is allocated to reencoding) for reencoding from the variable length encoding unit 46.

The encoding mode determination unit 20 according to the first embodiment changes values of threshold values TH1 to TH3 of the above-mentioned formulas (1) to (3) so that a field encoding mode is more easily selected as an encoding bit rate for reencoding is lowered (an amount of information which is allocated to reencoding is decreased). An example in which an encoding mode is determined by using the formula (1) is described for the sake of simplicity of description, but the formula (2), the formula (3), or another determination formula may be used.

Here, the decoding unit 12 is an example of a decoding unit in the technique of the present disclosure, the importance degree information acquisition unit 16 is an example of an importance degree information acquisition unit in the technique of the present disclosure, and the reencoding information acquisition unit 48 is an example of a reencoding information acquisition unit in the technique of the present disclosure. Further, the encoding mode determination unit 20 is an example of an encoding mode determination unit in the technique of the present disclosure and the reencoding unit 14 is an example of a reencoding unit in the technique of the present disclosure.

As an operation of the first embodiment, decoding/encoding mode acquisition processing performed by the decoding unit 12 and the importance degree information acquisition unit 16 is first described with reference to FIG. 2. In step 200 of the decoding/encoding mode acquisition processing, the importance degree information acquisition unit 16 sets an initial value 0 as the number of blocks FieldNum of a field encoding mode. In following step 202, the variable length decoding unit 22 starts decoding of moving image data of one picture in a block unit.

In step 204, the importance degree information acquisition unit 16 acquires an encoding mode of a block which is a processing object from the variable length decoding unit 22. In following step 206, the importance degree information acquisition unit 16 determines whether or not the encoding mode which is acquired from the variable length decoding unit 22 is a field encoding mode. When the determination of step 206 is denied, the processing moves to step 210. When the determination of step 206 is affirmed, the processing moves to step 208. In step 208, the importance degree information acquisition unit 16 increments the number of blocks FieldNum of the field encoding mode by 1.

The inverse quantization and inverse orthogonal transform unit 24 performs inverse quantization processing in following step 210, the inverse quantization and inverse orthogonal transform unit 24 performs inverse orthogonal transform processing in step 212, and the motion compensation unit 30 performs motion compensation processing in step 214. In step 216, the variable length decoding unit 22 determines whether or not to have performed decoding of all blocks of one picture. When the determination is denied, the processing returns to step 202 and step 202 to step 216 are repeated. Accordingly, the number of blocks FieldNum in the field encoding mode is counted. Then, when the determination of step 216 is affirmed, the processing is ended.

Here, the number of blocks FieldNum in the field encoding mode is counted in the above description. However, the number of blocks in the frame encoding mode may be counted instead of the number of blocks FieldNum in the field encoding mode or both of the number of blocks FieldNum in the field encoding mode and the number of blocks in the frame encoding mode may be counted. However, the number of all blocks of a processing picture is given by the encoding size, so that it is possible to obtain a rate of the field encoding mode in a picture if the number of blocks in the field encoding mode is obtained.

The number of blocks FieldNum in the field encoding mode may be decided by referring to a DCT type of each macro block in an original bit stream or referring to a prediction type, for example. FIG. 3 illustrates syntax of a macro block mode in MPEG2. As elements indicating a field encoding mode or a frame encoding mode, there are frame_motion_type, field_motion_type, and dct_type.

A DCT type (dct_type) becomes frame DCT when DCT is performed by using blocks which are taken out by reading pixels of a macro block for every line and becomes field DCT when DCT is performed by using blocks which are taken out for every other line. FIG. 4 illustrates a DCT mode in MPEG2 written standards. An upper diagram of FIG. 4 illustrates frame DCT and a lower diagram of FIG. 4 illustrates field DCT.

Regarding a prediction type as well, a type varies basically depending on execution of motion search by using blocks read for every line or execution of motion search by using blocks taken out for every other line, as is the case with the DCT type. A prediction mode which has a motion vector in a frame block unit is referred to as frame prediction (frame_pred) and a prediction mode which has a motion vector in a field block unit is referred to as field prediction (field_pred).

FIGS. 5 to 7 respectively illustrate elements taken by frame_motion_type, field_motion_type, and dct_type. In this example, a prediction mode described as Frame-based is assumed to be frame prediction and other prediction modes including Dual-Prime prediction and 16×8MC prediction are assumed to be field prediction. Further, regarding dct_type depicted in FIG. 7, dct_type is frame DCT when a value is 0 and dct_type is field DCT when a value is 1. There is a case where dct_type is not explicitly expressed in a bit stream. In such case, dct_type is determined as a table depicted in FIG. 7.

Further, in a case of an I picture, inter-frame prediction is not performed and there is no motion vector, being expressed as FieldNum=Σ(FieldDCT). In a case of a P picture and a B picture, FieldNum=Σ(FieldDCT/FieldPred) may be expressed. Of course, in the case of a P picture and a B picture, determination may also be performed by only one element as FieldNum=Σ(FieldPred), for example.

A case where an original bit stream before reencoding is a bit stream of MPEG2 has been described above, but the same thinking goes for a case where an original bit stream is a bit stream of MPEG-4AVC(H.264), as well. Counting of whether a block is encoded in a frame encoding mode or encoded in a field encoding mode is performed in a processing block unit, enabling obtaining of the number of blocks FieldNum of the field encoding mode.

Subsequently, reencoding mode determination processing performed by the encoding mode determination unit 20 is described with reference to FIG. 8. In step 220, the encoding mode determination unit 20 determines a picture type and branches the processing depending on the picture type. That is, when the picture type is a P picture or a B picture, the encoding mode determination unit 20 ends the processing. When the picture type is an I picture, the encoding mode determination unit 20 moves the processing to step 222. In step 222, the encoding mode determination unit 20 determines whether or not the number of blocks FieldNum in the field encoding mode is equal to or larger than the threshold value TH1. Here, a rate with respect to the total number of blocks in a picture may be used for determination instead of the number of blocks FieldNum of the field encoding mode. When the determination of step 222 is affirmed, the processing moves to step 224. In step 224, the encoding mode determination unit 20 determines the field encoding mode as a reencoding mode. When the determination of step 222 is denied, the processing moves to step 226. In step 226, the encoding mode determination unit 20 determines the frame encoding mode as a reencoding mode.

In simple consideration, the threshold value TH1 is set to be a half of a rate with respect to the total number of blocks in a picture, namely, 50%. However, in order to make the field encoding mode be easily selected, the threshold value TH1 may be set to have a lower value such as approximately 40% or may be set to conversely have a higher value such as 60%, for example.

Figure 8:
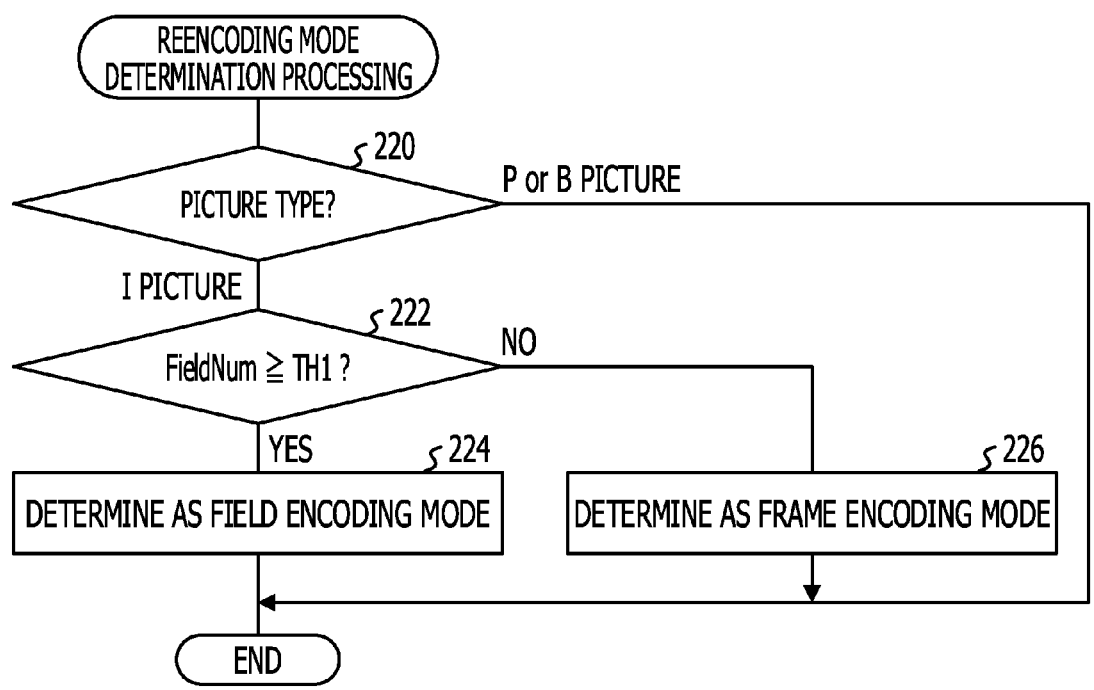
FIG. 8 is a flowchart illustrating reencoding mode determination processing according to the first embodiment.

In the reencoding mode determination processing illustrated in FIG. 8, a picture type which is used in reencoding is first determined. This processing may be used for manipulating switching frequency of encoding modes. For example, in the reencoding mode determination processing illustrated in FIG. 8, switching of encoding modes of a picture is enabled only in intra-frame encoding (I picture) and switching of encoding modes is performed in a group of pictures (GOP) unit. If switching of encoding modes of a picture is enabled only in an I picture and a P picture, encoding mode switching is enabled in a reorder unit of a frame for motion prediction of encoding. Of course, determination of whether an encoding mode is a frame encoding mode or a field encoding mode may be executed in all picture types.

In the reencoding mode determination processing illustrated in FIG. 8, switching of encoding modes of a picture in a GOP unit is enabled. In this case, the number of blocks FieldNum in the field encoding mode may be the number of blocks related to field encoding of a decoded picture corresponding to an I picture in reencoding in the field encoding mode. Alternatively, the number of blocks FieldNum in the field encoding mode may be the number of blocks related to field encoding of a decoded picture corresponding to 1 GOP including an I picture in reencoding.

In the first embodiment, the threshold value TH1 which is used in the reencoding mode determination processing illustrated in FIG. 8 is changed by using an encoding bit rate in reencoding. An encoding bit rate is a setting parameter in a transcoder in may cases, so that it is commonly possible to acquire a setting value from an external interface such as an API. As described above, when a bit rate of encoding is lowered, encoding efficiency of the field encoding mode becomes higher. Therefore, a threshold value is decreased as a reencoding bit rate EncBitrate is decreased. For example, a threshold value TH1' after alteration which is used as the threshold value TH1 in the above-mentioned formula (1) may be obtained by the following formula (6).

$$TH1'=F1(EncBitrate) \times TH1 \qquad (6)$$

Here, F1(n) in the formula (6) denotes a decreasing function with respect to n. Regarding F1(n), when encoding is assumed to be H.264, a quantization scale exponentially increases with respect to a quantization parameter QP value. When a quantization scale value is denoted as QScale, a specific calculating formula is defined by the following formula (7).

$$QScale = \varepsilon \cdot 2^{\frac{QP}{6}} \qquad (7)$$

ε in the formula (7) denotes a constant which is changed depending on a frequency position of a DCT coefficient and takes several patterns. From the formula (7), the formula (8) is obtained.

$$QP = 6 * \log_2\left(\frac{QScale}{\varepsilon}\right) \qquad (8)$$

A generated information amount increases in proportion to a quantization scale, so that F1(n) is possible to be expressed as a function of the following formula (9) which logarithmically decreases.

$$F1(n) = -\alpha^* \log_2(n) + \beta \qquad (9)$$

Here, in the formula (9), α and β are constants which respectively satisfy α>0 and β>0. The constants α and β of the formula (9) may be adaptively changed depending on a point on which encoding efficiency of the frame encoding mode and encoding efficiency of the field encoding mode cross with each other (for example, a point on which a bit rate is approximately 1.3 Mbps in the example of FIG. 17), the horizontal size and the vertical size of encoding, and the like.

Thus, according to the first embodiment, the threshold value TH1 which is used in reencoding mode determination is changed in accordance with an encoding bit rate in reencoding. Accordingly, even if a bit rate in reencoding is low, it is possible to select an appropriate encoding mode having high encoding efficiency without performing 2 pass reencoding.

[Second Embodiment]

A technique of a second embodiment of the present disclosure is now described. Since the second embodiment has the same configuration as that of the first embodiment, respective elements are given the same reference characters and description of the configuration is omitted. Hereinafter, an operation of the second embodiment is described.

In the second embodiment, threshold values TH1 to TH3 in the above-mentioned formulas (1) to (3) are changed in accordance with a rate of a generated information amount of each picture type, as is the case with the above-described first embodiment. Specifically, a rate of a generated information amount of an I picture in the whole generated information amount (a generated information amount of all picture types) is obtained in a GOP unit and the like. As a bit rate of reencoding is lowered, a rate of a generated information amount of an I picture with respect to the whole generated information amount increases. Therefore, a weight (cost) of frame/field determination in a picture unit is changed by changing the threshold values TH1 to TH3 depending on the corresponding rate, in the second embodiment.

Figure 9:
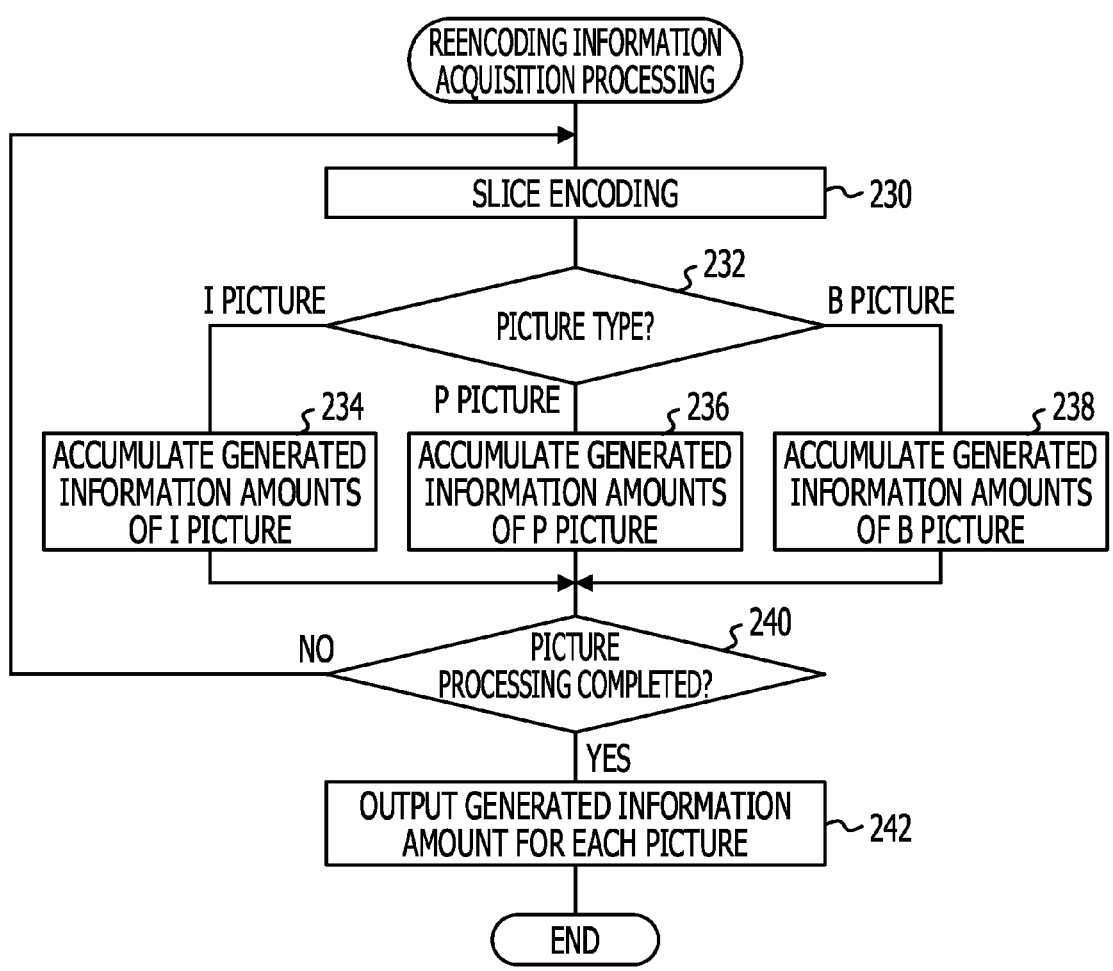
FIG. 9 is a flowchart illustrating reencoding information acquisition processing according to a second embodiment.

Referring to FIG. 9, reencoding information acquisition processing according to the second embodiment is described. The reencoding information acquisition processing illustrated in FIG. 9 is performed in a picture unit. In step 230 of the reencoding information acquisition processing, the variable length encoding unit 46 performs entropy encoding processing in a slice unit. In following step 232, the reencoding information acquisition unit 48 determines a picture type and branches the processing depending on the picture type. When the picture type is an I picture, the processing moves from step 232 to step 234. In step 234, the reencoding information acquisition unit 48 acquires a generated information amount which is obtained as a result of the entropy encoding in a slice unit from the variable length encoding unit 46 and accumulates the acquired generated information amount on a generated information amount of an I picture.

Further, when the picture type is a P picture, the processing moves from step 232 to step 236. In step 236, the reencoding information acquisition unit 48 acquires a generated information amount which is obtained as a result of the entropy encoding in a slice unit from the variable length encoding unit 46 and accumulates the acquired generated information amount on a generated information amount of a P picture. Further, when the picture type is a B picture, the processing moves from step 232 to step 238. In step 238, the reencoding information acquisition unit 48 acquires a generated information amount which is obtained as a result of the entropy encoding in a slice unit from the variable length encoding unit 46 and accumulates the acquired generated information amount on a generated information amount of a B picture.

In following step 240, the reencoding information acquisition unit 48 determines whether or not encoding processing of one picture has been completed. When the determination of step 240 is denied, the processing returns to step 230 and step 230 to step 240 are repeated until the determination of step 240 is affirmed. For example, entropy encoding processing such as CABAC is executed in a slice unit in H.264, so that the entropy encoding processing in step 230 is executed once or more times in accordance with the number of slices in a picture. Then, generated information amounts of one picture are accumulated for each picture type. When the determination of step 240 is affirmed, the processing moves to step 242. In step 242, the reencoding information acquisition unit 48 outputs the generated information amount of each picture type to the encoding mode determination unit 20 and ends the reencoding information acquisition processing.

In the above-described reencoding information acquisition processing, the size of a bit rate of reencoding is obtained on the basis of an actual-generated information amount, enabling suitable threshold value control even in a case where a bit rate fluctuates due to designs, namely, a variable bit rate (VBR).

In the second embodiment, the encoding mode determination unit 20 changes the threshold value TH1 in accordance with the following formula (10) on the basis of a generated information amount of each picture type which is inputted from the reencoding information acquisition unit 48.

$$TH1 = F2\{EncIPicInfo/\Sigma(EndIPicInfo, EncPPicInfo, EncBPicInfo)\} \times TH1 \qquad (10)$$

Here, in the formula (10), EncIPicInfo, EncPPicInfo, and EncBPicInfo denote generated information amounts of respective picture types and F2(n) denotes a decreasing function with respect to n. In the formula (10), a value of the threshold value TH1' is decreased as a rate of a generated information amount of an I picture increases with respect to a sum of generated information amounts of all picture types of I, P, and B, as is the case with the first embodiment.

Thus, in the second embodiment, the threshold value TH1 which is used in reencoding mode determination is changed depending on a generated information amount in a picture unit for individual picture types of reencoding. Accordingly, it is possible to select a suitable encoding mode having high encoding efficiency without performing 2 pass reencoding even in a case where a bit rate in reencoding is low.

An example in which statistical information (a generated information amount of each picture type) which is acquired by the reencoding information acquisition unit 48 from the reencoding unit 14 is fed back to the threshold values TH1 to TH3 of determination formulas (the formulas (1) to (3)) of an encoding mode is described with reference to FIGS. 10 and 11. Processing delay occurs on a reencoding side between determination of an encoding mode performed by using the formulas (1) to (3) on a decoding side and calculation of the formula (10) on the reencoding side, so that feedback of statistical information is also delayed.

Figure 10:
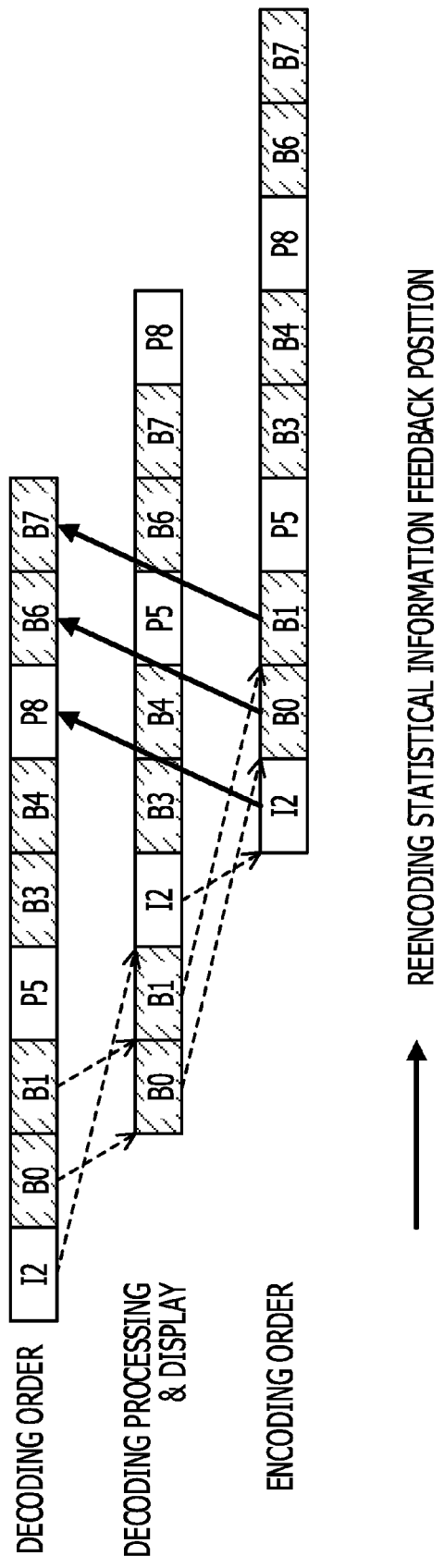
FIG. 10 is a timing chart illustrating an example in which statistical information which is acquired from a reencoding unit is fed back to a threshold value of a determination formula of an encoding mode.

For example, FIG. 10 illustrates an example in which a bit stream having the GOP configuration of two B pictures is reencoded. Reorder processing of frames for performing backward prediction of the B picture is performed on the decoding side and reorder processing is performed again on the reencoding side similarly to normal encoding processing. An arrow drawn by a dotted line in FIG. 10 represents transition of processing of an identical frame. In this case, delay for one to four frames occurs in the reorder processing on the decoding side and delay for one to four frames occurs in the reorder processing on the reencoding side. Thus, processing delay for approximately five frames overall occurs. Tendencies of an I picture, a P picture, and a B picture are different from each other in practice, so that statistical information on the reencoding side is possible to be fed back with delay for six frames, as depicted by bold solid lines in FIG. 10. Regarding this feedback, a value which is calculated in a large flow such as a rate of a generated information amount of approximately 1 GOP, for example, is fed back by the formula (10), so that it is assumed that a certain level of delay may be permitted.

Figure 11:
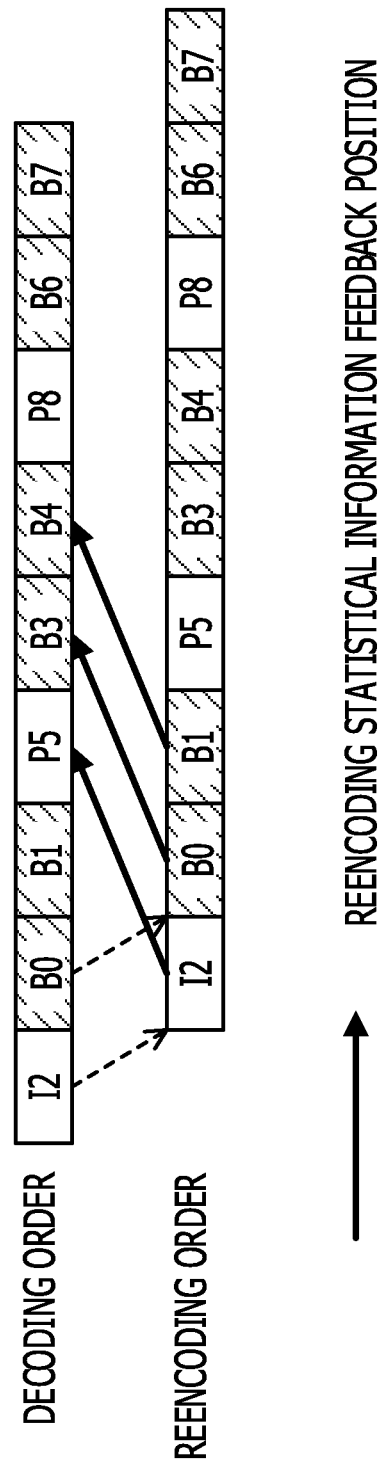
FIG. 11 is a timing chart illustrating an example in which statistical information which is acquired from the reencoding unit is fed back to a threshold value of a determination formula of an encoding mode.

FIG. 11 illustrates another example of reencoding. Regarding reencoding, there is a method in which reencoding is performed while maintaining reordering which is performed in encoding. That is, if decoding is performed in an order of I2, B0, B1, . . . on the decoding side, encoding is performed in the same order as I2, B0, B1, . . . on the reencoding side as well. Reference or non-reference of a motion vector is compatibly practicable when reencoding is performed while maintaining decoding order processing and the GOP configuration, enabling execution of reencoding with suppressed processing delay. That is, it is possible to execute reencoding with processing delay for one frame. In this case as well, feedback is practicable with delay for three frames as depicted by bold solid lines of FIG. 11 when it is considered that an I picture and a P picture are fed back to an I picture and a P picture and a B picture is fed back to a B picture, as is the case with FIG. 10.

[Third Embodiment]

A technique of a third embodiment of the present disclosure is now described. Since the third embodiment has the same configuration as those of the first embodiment and the second embodiment, respective elements are given the same reference characters and description of the configuration is omitted. Hereinafter, an operation of the third embodiment is described.

In the third embodiment, threshold values TH1 to TH3 of determination formulas (the formulas (1) to (3)) of an encoding mode is altered on the basis of a rate of a global complexity measure (GCM: complexity of individual picture types of reencoding). Here, GCM=generated information amount of picture×average quantization value of picture . . . (11) is expressed. In the third embodiment, a GCM is calculated for each picture type and a threshold value is changed depending on a rate of a GCM of an I picture with respect to a sum of the whole GCM (GCMs of all picture types). As a bit rate is lowered, a rate of a GCM of an I picture with respect to the whole GCM is increased. Therefore, the threshold values TH1 to TH3 are changed on the basis of the rate so as to change a weight (cost) of frame/field determination in a picture unit, in the third embodiment.

Figure 12:
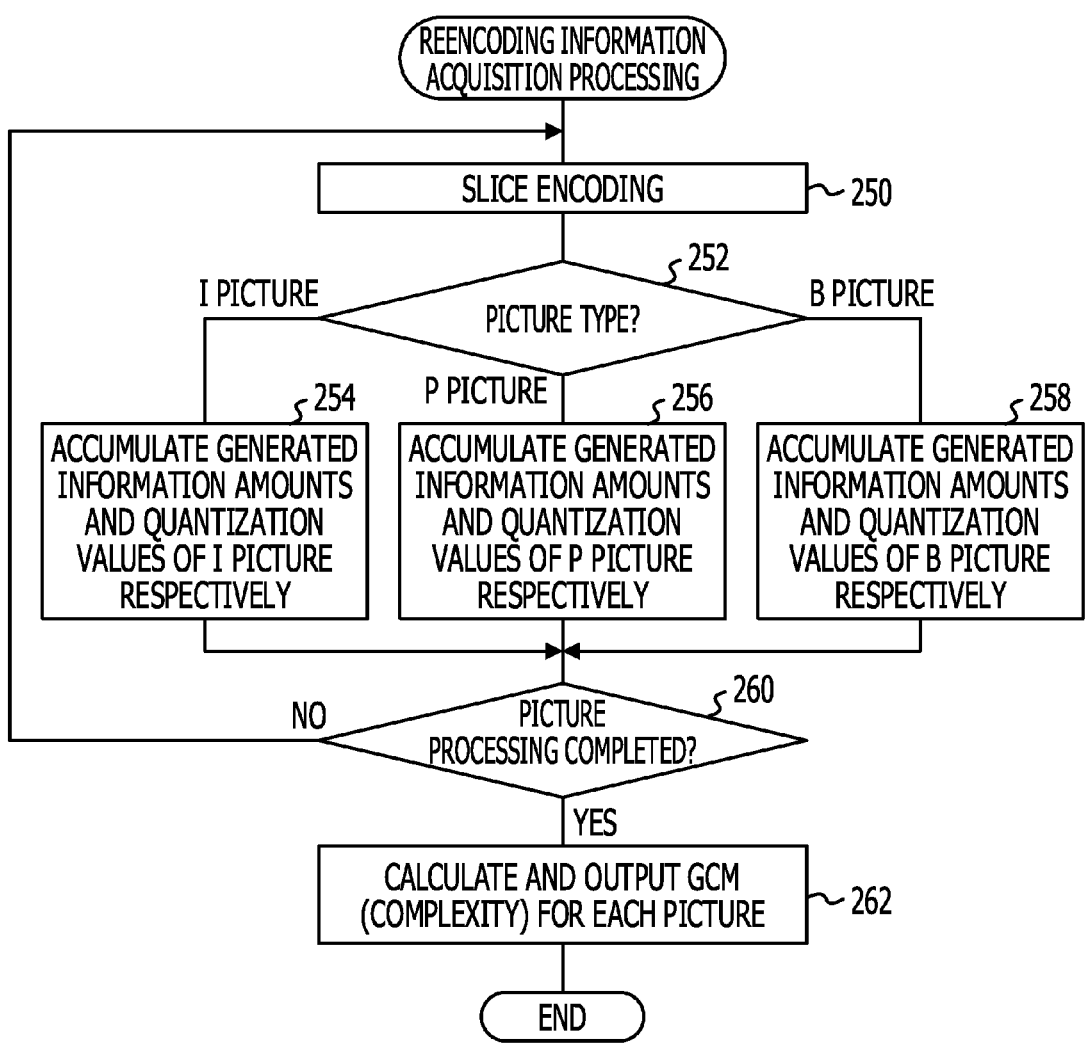
FIG. 12 is a flowchart illustrating reencoding information acquisition processing according to a third embodiment.

Referring to FIG. 12, a reencoding information acquisition processing according to the third embodiment is described. The reencoding information acquisition processing illustrated in FIG. 12 is performed in a picture unit. In step 250 of the reencoding information acquisition processing, the variable length encoding unit 46 performs entropy encoding processing in a slice unit. In following step 252, the reencoding information acquisition unit 48 determines a picture type and branches the processing depending on the picture type. When the picture type is an I picture, the processing moves from step 252 to step 254. In step 254, the reencoding information acquisition unit 48 acquires a generated information amount and a quantization value, which are obtained as a result of the entropy encoding in a slice unit, from the variable length encoding unit 46 and accumulates the acquired generated information amount and the acquired quantization value on a generated information amount and a quantization value of an I picture. Quantization values are divided by the number of processing blocks after an end of processing of one picture, so as to obtain an average quantization value. Here, an average quantization value may be obtained in processing after determination of step 260 is affirmed.

Further, when the picture type is a P picture, the processing moves from step 252 to step 256. In step 256, the reencoding information acquisition unit 48 acquires a generated information amount and a quantization value, which are obtained as a result of the entropy encoding in a slice unit, from the variable length encoding unit 46 and accumulates the acquired generated information amount and the acquired quantization value on a generated information amount and a quantization value of a P picture. Quantization values of a P picture are divided by the number of processing blocks after an end of processing of one picture, so as to obtain an average quantization value, as is the case with an I picture. Further, when the picture type is a B picture, the processing moves from step 252 to step 258. In step 258, the reencoding information acquisition unit 48 acquires a generated information amount and a quantization value, which are obtained as a result of the entropy encoding in a slice unit, from the variable length encoding unit 46 and accumulates the acquired generated information amount and the acquired quantization value on a generated information amount and a quantization value of a B picture. Quantization values of a B picture are divided by the number of processing blocks after an end of processing of one picture, so as to obtain an average quantization value, as is the case with an I picture.

In following step 260, the reencoding information acquisition unit 48 determines whether or not encoding processing of one picture has been completed. When the determination of step 260 is denied, the processing returns to step 250 and step 250 to step 260 are repeated until the determination of step 260 is affirmed. For example, entropy encoding processing such as CABAC is executed in a slice unit in H.264, so that the entropy encoding processing in step 250 is executed once or more times in accordance with the number of slices in a picture. Then, generated information amounts and an average quantization value of one picture are accumulated for each picture type.

When the determination of step 260 is affirmed, the processing moves to step 262. In step 262, the reencoding information acquisition unit 48 calculates a GCM of each picture type in accordance with the above-mentioned formula (11) and outputs the calculated GCM of each picture type to the encoding mode determination unit 20. Then, the reencoding information acquisition processing is ended.

In the third embodiment, the encoding mode determination unit 20 changes the threshold value TH1 in accordance with the following formula (12) on the basis of a GCM of each picture type which is inputted from the reencoding information acquisition unit 48.

$$TH1'=F3\{Xi/\Sigma(Xi,Xp,Xb)\} \times TH1 \quad (12)$$

Here, in the formula (12), Xi, Xp, and Xb denote GCMs of respective picture types and F3(n) denotes a decreasing function with respect to n. In the formula (12), a value of the threshold value TH1' is decreased as a rate of a GCM of an I picture increases with respect to a sum of GCMs of all picture types of I, P, and B, as is the case with the first embodiment and the second embodiment.

Thus, in the third embodiment, the threshold value TH1 which is used in reencoding mode determination is changed depending on a GCM for each picture type of reencoding. Accordingly, it is possible to select a suitable encoding mode having high encoding efficiency without performing 2 pass reencoding even in a case where a bit rate in reencoding is low.

Here, the decreasing functions F2(n) and F3(n) in the second embodiment and the third embodiment express a rate with respect to the whole of generated information amounts and GCMs, so that it is conceivable that the decreasing functions F2(n) and F3(n) may be expressed as a simple linear function (for example, refer to the following formula (13)) having a negative slope.

$$Fk(n)=-\chi \times n+\delta \quad (13)$$

In the formula (13), k, $\chi$, and $\delta$ are constants satisfying k=2, 3, $\chi$>0, and $\delta$>0 respectively.

[Fourth Embodiment]

A technique of a fourth embodiment of the present disclosure is now described. Since the fourth embodiment has the same configuration as those of the first embodiment to the third embodiment, respective elements are given the same reference characters and description of the configuration is omitted. Hereinafter, an operation of the fourth embodiment is described.

In the fourth embodiment, threshold values TH1 to TH3 of determination formulas (the formulas (1) to (3)) of an encoding mode are altered on the basis of the size of a quantization value which is used for reencoding. In the fourth embodiment, a quantization value of a target is calculated for each picture type and determination of a field encoding mode/a frame encoding mode is changed depending on the size of the obtained quantization value of each picture type. Here, for target quantization of each picture type, an average quantization value for each picture type which is obtained in obtaining a GCM in the above-described third embodiment is applicable. Processing for obtaining an average quantization value for each picture type is same as the reencoding information acquisition processing (FIG. 12) described in the third embodiment, so that the description thereof is omitted.

Figure 13:
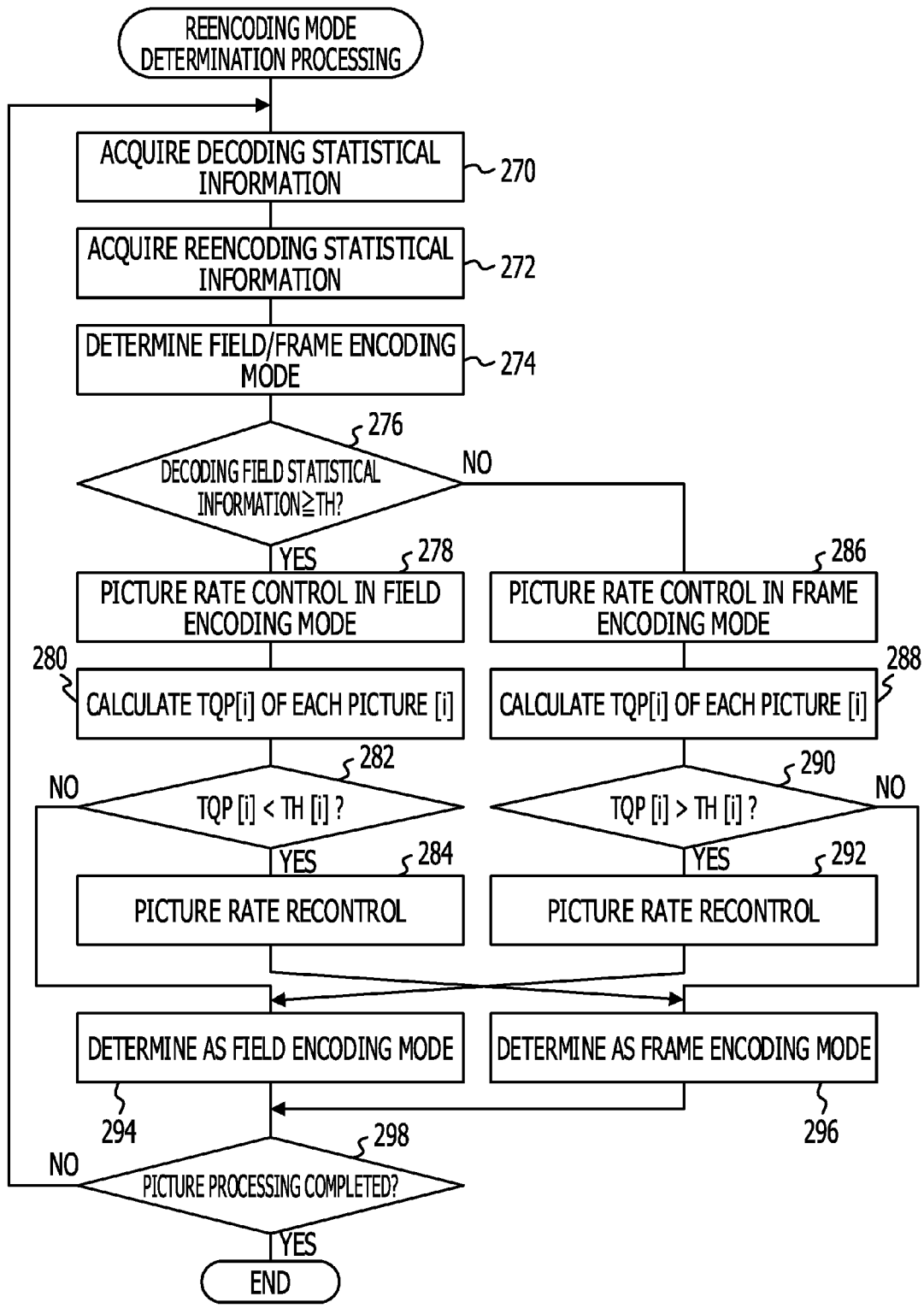
FIG. 13 is a flowchart illustrating reencoding mode determination processing according to a fourth embodiment.

Referring to FIG. 13, a reencoding mode determination processing according to the fourth embodiment is described. In the reencoding mode determination processing, determination of a field encoding mode/a frame encoding mode of each picture is changed by using a target information amount which is allocated in rate control for individual picture types.

Specifically, in step 270, the importance degree information acquisition unit 16 first acquires statistical information (for example, a generated information amount of each encoding mode) which is obtained by decoding performed by the variable length decoding unit 22. Further, in step 272, the reencoding information acquisition unit 48 acquires statistical information (for example, an average quantization value for each picture type) which is obtained by reencoding performed by the variable length encoding unit 46. In following steps 274 and 276, the encoding mode determination unit 20 determines whether an encoding mode in reencoding is a field encoding mode or a frame encoding mode, on the basis of the pieces of information which are obtained in steps 270 and 272. This determination may be performed on the basis of whether or not decoding field statistical information is equal to or larger than a threshold value TH, for example.

When the encoding mode determination unit 20 determines that an encoding mode in reencoding is a field encoding mode, the processing moves from step 276 to step 278 and the reencoding unit 14 performs picture rate control in the field encoding mode in step 278. Further, in following step 280, the encoding mode determination unit 20 calculates a target QP (TQP[i]) of each picture [i].

For example, when a current picture encoding mode for reencoding is the frame encoding mode, an amount of information which is allocated by the rate control of a picture is obtained by the following formula (14) by using picture information allocation of a reference model test model 5 (TM5) of MPEG-2.

$$Ti = \max\left\{\frac{R}{Ni + \frac{NpXp}{KpXi} + \frac{NbXb}{KbXi}}, \frac{EncBitrate}{8*\text{picture\_rate}}\right\} \quad (14)$$

$$Tp = \max\left\{\frac{R}{Np + \frac{NbKpXb}{KbXp}}, \frac{EncBitrate}{8*\text{picture\_rate}}\right\}$$

$$Tb = \max\left\{\frac{R}{Nb + \frac{NpKbXp}{KpXb}}, \frac{EncBitrate}{8*\text{picture\_rate}}\right\}$$

In the formula (14), Ti, Tp, and Tb respectively denote allocation information amounts of an I picture, a P picture, and a B picture, Kp and Kb denote rates of quantization of the P picture and the B picture with respect to quantization of the I picture, and Ni, Np, and Nb denote the numbers of residual pictures of I pictures, P pictures, and B pictures in a GOP. Further, picture_rate denotes a setting frame rate.

Here, when targets QP of respective pictures are set as TQPi, TQPp, and TQPb and GCMs of respective pictures are set as Xi, Xp, and Xb, the following formula (15) is obtained because GCM=generated information amount×average quantization value, that is, average quantization value=GCM/generated information amount.

$$TQPi=Xi/Ti, TQPp=Xp/Tp, TQPb=Xb/Tb \quad (15)$$

By the above formula (15), targets QP (TQP[i]) of respective pictures [i] are calculated.

In step 282, the encoding mode determination unit 20 determines whether or not the calculated targets QP (TQP[i]) of respective pictures [i] are less than the threshold value TH[i]. When the determination of step 282 is denied, the processing moves from step 282 to step 294, and the reencoding unit 14 continues the picture rate control in the field encoding mode. On the other hand, when the determination of step 282 is affirmed, for example, when TQPi<THi, TQPp<THp, and TQPb<THb are satisfied, the processing moves from step 282 to step 284. Then, in steps 284 and 286, the reencoding unit 14 changes the encoding mode to the frame encoding mode and performs recontrol of a picture rate.

Further, when the encoding mode determination unit 20 determines that an encoding mode in reencoding is the frame encoding mode in steps 274 and 276, the processing moves from step 276 to step 286. In step 286, the reencoding unit 14 performs picture rate control in the frame encoding mode. Further, in following step 288, the encoding mode determination unit 20 calculates a target QP (TQP[i]) of each picture [i] by the above-mentioned formula (15).

In step 290, the encoding mode determination unit 20 determines whether or not the calculated target QP (TQP[i]) of each picture [i] is larger than the threshold value TH[i]. When the determination of step 290 is denied, the processing moves from step 290 to step 296 and the reencoding unit 14 continues the picture rate control in the frame encoding mode. On the other hand, when the determination of step 290 is affirmed, for example, when TQPi>THi, TQPp>THp, and TQPb>THb are satisfied, the processing moves from step 290 to step 292. Then, in steps 292 and 294, the reencoding unit 14 changes the encoding mode to the field encoding mode and performs recontrol of a picture rate.

In following step 298, the encoding mode determination unit 20 determines whether or not processing of one picture has been completed. When the determination of step 298 is denied, the processing returns to step 270 and steps 270 to 298 are repeated until the determination of step 298 is affirmed. Then, when the determination of step 298 is affirmed, the reencoding mode determination processing is ended.

Thus, in the fourth embodiment, an encoding mode is changed on the basis of the size relation between a target QP (TQP[i]) for individual picture types and a threshold value TH[i] as appropriate after picture rate control in a certain encoding mode is once started. Accordingly, it is possible to select a suitable encoding mode having high encoding efficiency without performing 2 pass reencoding even in a case where a bit rate in reencoding is low.

[Fifth Embodiment]

A technique of a fifth embodiment of the present disclosure is now described. Since the fifth embodiment has the same configuration as those of the first embodiment to the fourth embodiment, respective elements are given the same reference characters and description of the configuration is omitted. Hereinafter, an operation of the fifth embodiment is described.

The example in which processing is performed for each picture type has been described in the above-described first to third embodiments, but statistical information is acquired more finely in a macro block unit, in the fifth embodiment. Specifically, threshold value change is performed on the basis of the number of blocks for each macro block type (intra macro block/non-intra macro block) or a generated information amount for each macro block type instead of information for each picture type.

Figure 14:
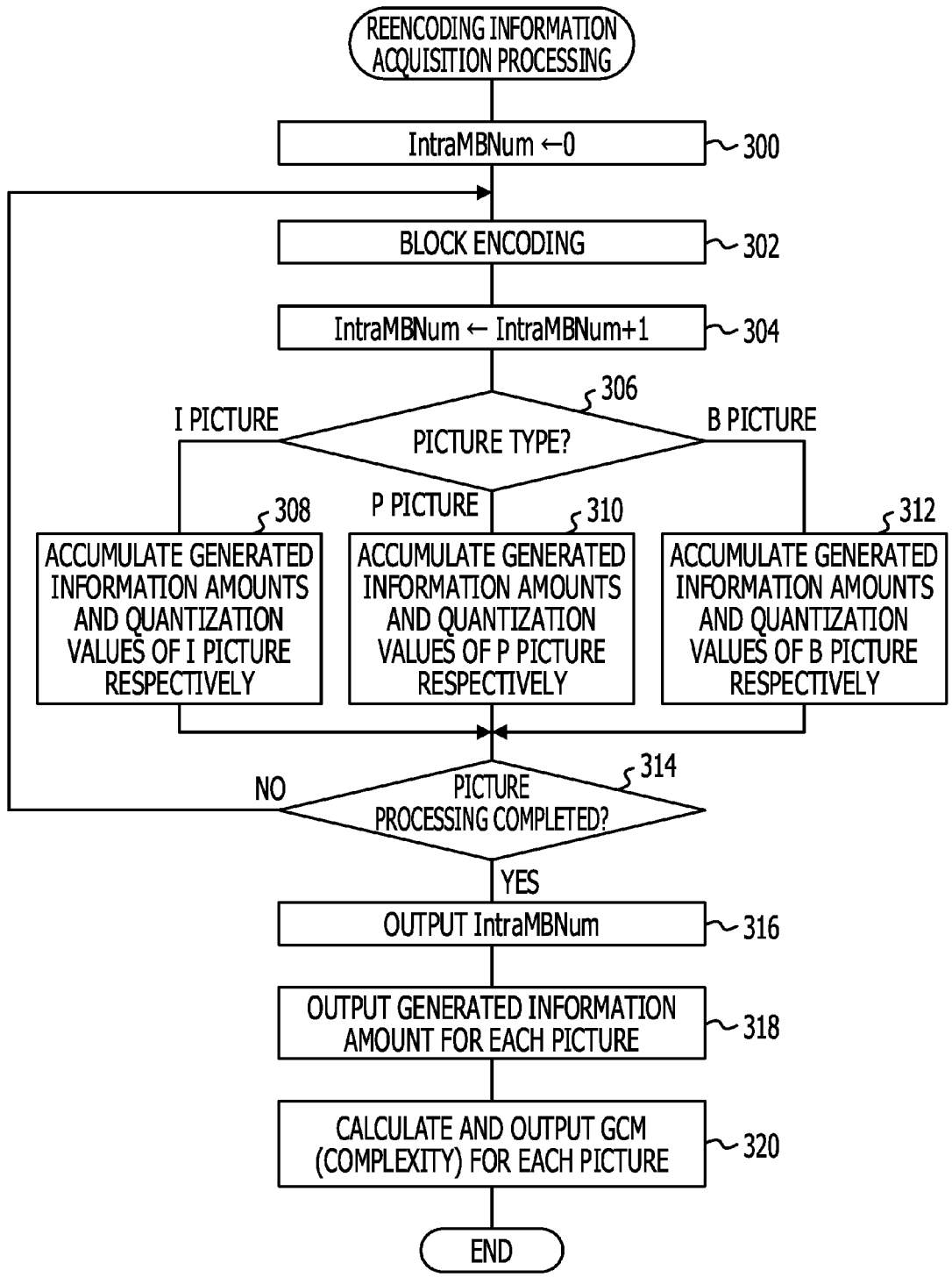
FIG. 14 is a flowchart illustrating reencoding information acquisition processing according to a fifth embodiment.

Referring to FIG. 14, a reencoding information acquisition processing according to the fifth embodiment is described. The reencoding information acquisition processing illustrated in FIG. 14 is performed in a picture unit. In step 300 of the reencoding information acquisition processing, the reencoding information acquisition unit 48 initializes a variable number IntraMBNum to 0. In following step 302, the variable length encoding unit 46 performs entropy encoding processing in a block unit. In following step 304, the reencoding information acquisition unit 48 increments the variable number IntraMBNum by 1.

In following step 306, the reencoding information acquisition unit 48 determines a picture type and branches the processing depending on the picture type. When the picture type is an I picture, the processing moves from step 306 to step 308. In step 308, the reencoding information acquisition unit 48 acquires a generated information amount and a quantization value, which are obtained as a result of the entropy encoding in a block unit, from the variable length encoding unit 46 and accumulates the acquired generated information amount and the acquired quantization value on a generated information amount and a quantization value of an I picture. Quantization values are divided by the number of processing blocks after an end of processing of one picture, so as to obtain an average quantization value. Here, an average quantization value may be obtained in processing after determination of step 314 is affirmed.

Further, when the picture type is a P picture, the processing moves from step 306 to step 310. In step 310, the reencoding information acquisition unit 48 acquires a generated information amount and a quantization value, which are obtained as a result of the entropy encoding in a block unit, from the variable length encoding unit 46 and accumulates the acquired generated information amount and the acquired quantization value on a generated information amount and a quantization value of a P picture. Quantization values of a P picture are divided by the number of processing blocks after an end of processing of one picture, so as to obtain an average quantization value, as is the case with an I picture. Further, when the picture type is a B picture, the processing moves from step 306 to step 312. In step 312, the reencoding information acquisition unit 48 acquires a generated information amount and a quantization value, which are obtained as a result of the entropy encoding in a block unit, from the variable length encoding unit 46 and accumulates the acquired generated information amount and the acquired quantization value on a generated information amount and a quantization value of a B picture. Quantization values of a B picture are divided by the number of processing blocks after an end of processing of one picture, so as to obtain an average quantization value, as is the case with an I picture.

In following step 314, the reencoding information acquisition unit 48 determines whether or not encoding processing of one picture has been completed. When the determination of step 314 is denied, the processing returns to step 302 and step 302 to step 314 are repeated until the determination of step 314 is affirmed. When the determination of step 314 is affirmed, the processing moves to step 316. In step 316, the reencoding information acquisition unit 48 outputs the variable number IntraMBNum to the encoding mode determination unit 20. Further, in following step 318, the reencoding information acquisition unit 48 outputs a generated information amount for each picture type to the encoding mode determination unit 20. Further, in step 320, the reencoding information acquisition unit 48 calculates a GCM of each picture type in accordance with the above-mentioned formula (11) and outputs the calculated GCM for each picture type to the encoding mode determination unit 20. Then, the reencoding information acquisition processing is ended.

Statistical information which is obtained in a block unit by the above-described reencoding information acquisition processing is applicable for change of a threshold value, as is the case with information feedback in a picture unit in the second embodiment and the third embodiment. In the decreasing functions F2(n) and F3(n) described in the second embodiment and the third embodiment, determination is performed on the basis of a rate of an I picture with respect to the whole information, in a picture unit. However, a threshold value may be changed so as to perform determination on the basis of a rate of an intra macro block B with respect to the whole information, in the fifth embodiment.

In the first to third embodiments, regarding the number of intra macro blocks in an I picture, the number of intra macro blocks in the frame encoding mode is twice as large as the number of intra macro blocks in the field encoding mode, so that the field encoding mode is made be easily selected in a case of a low bit rate. However, there is a possibility that intra macro blocks exist in a P picture and a B picture as well. According to the fifth embodiment, this point is also taken into account.

[Sixth Embodiment]

Figure 15:
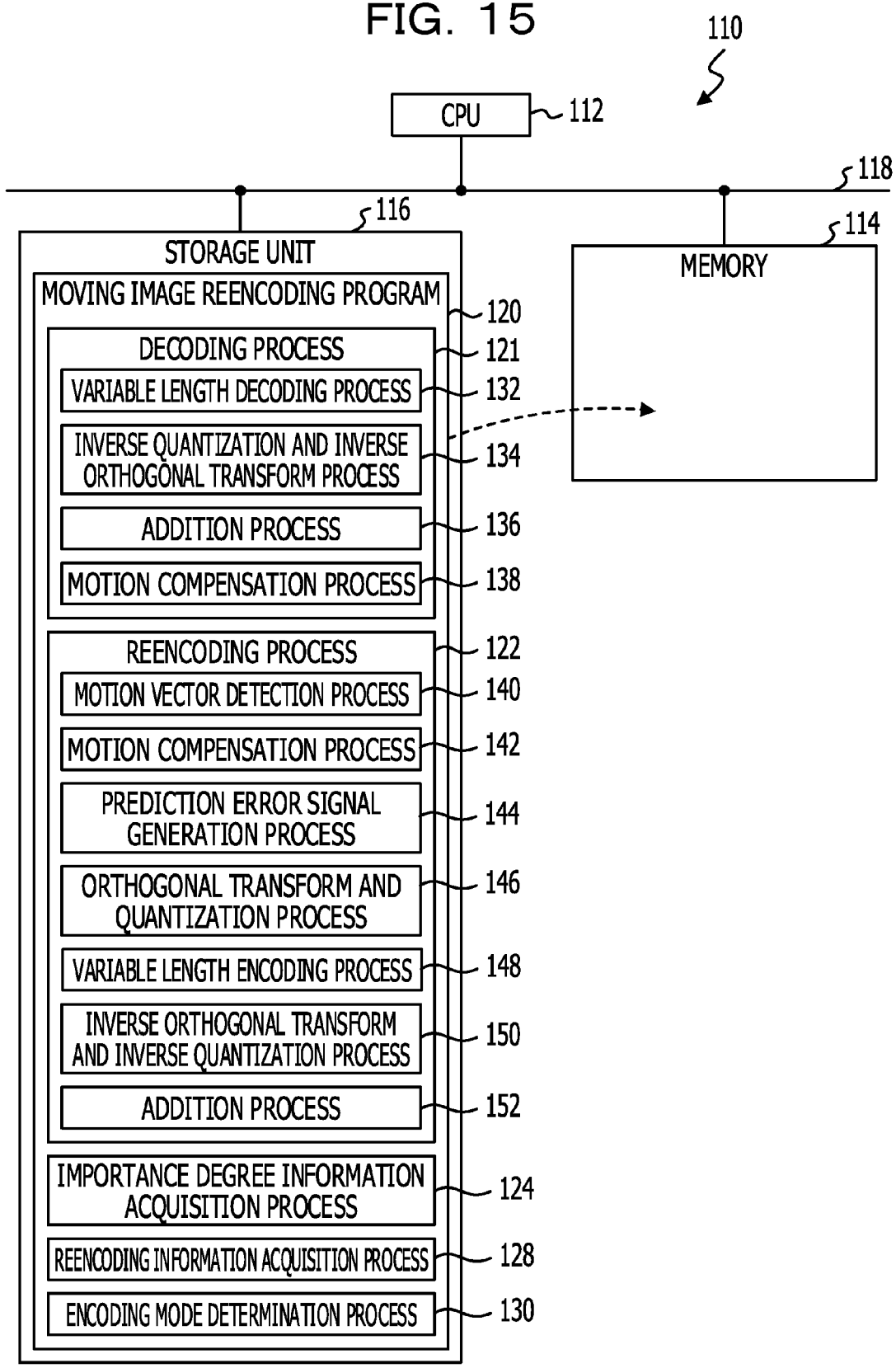
FIG. 15 is a schematic block diagram illustrating a computer according to a sixth embodiment.

A technique of a sixth embodiment of the present disclosure is now described. FIG. 15 illustrates a computer 110 which is capable of functioning as the moving image reencoding device 10.

The computer 110 includes a CPU 112, a memory 114, and a nonvolatile storage unit 116. The CPU 112, the memory 114, and the nonvolatile storage unit 116 are connected with each other via a bus 118. Here, the storage unit 116 may be realized by a hard disk drive (HDD), a flash memory, or the like. In the storage unit 116 serving as a recording medium, a moving image reencoding program 120 for making the computer 110 function as the moving image reencoding device 10 is stored. The CPU 112 reads the moving image reencoding program 120 from the storage unit 116 and develops the moving image reencoding program 120 on the memory 114 so as to execute processes included in the moving image reencoding program 120 in sequence.

The moving image reencoding program 120 includes a decoding process 121, a reencoding process 122, an importance degree information acquisition process 124, a reencoding information acquisition process 128, and an encoding mode determination process 130.

The CPU 112 executes the decoding process 121, thus functioning as the decoding unit 12 depicted in FIG. 1. The CPU 112 executes the reencoding process 122, thus functioning as the reencoding unit 14 depicted in FIG. 1. The CPU 112 executes the importance degree information acquisition process 124, thus functioning as the importance degree information acquisition unit 16 depicted in FIG. 1. The CPU 112 executes the reencoding information acquisition process 128, thus functioning as the reencoding information acquisition unit 48 depicted in FIG. 1. The CPU 112 executes the encoding mode determination process 130, thus functioning as the encoding mode determination unit 20 depicted in FIG. 1.

Further, the decoding process 121 includes a variable length decoding process 132, an inverse quantization and inverse orthogonal transform process 134, an addition process 136, and a motion compensation process 138. The CPU 112 executes the variable length decoding process 132, thus functioning as the variable length decoding unit 22 depicted in FIG. 1. The CPU 112 executes the inverse quantization and inverse orthogonal transform process 134, thus functioning as the inverse quantization and inverse orthogonal transform unit 24 depicted in FIG. 1. The CPU 112 executes the addition process 136, thus functioning as the addition unit 26 depicted in FIG. 1. The CPU 112 executes the motion compensation process 138, thus functioning as the motion compensation unit 30 depicted in FIG. 1.

Further, the reencoding process 122 includes a motion vector detection process 140, a motion compensation process 142, a prediction error signal generation process 144, an orthogonal transform and quantization process 146, and a variable length encoding process 148. The reencoding process 122 further includes an inverse orthogonal transform and inverse quantization process 150 and an addition process 152.

The CPU 112 executes the motion vector detection process 140, thus functioning as the motion vector detection unit 32 depicted in FIG. 1. The CPU 112 executes the motion compensation process 142, thus functioning as the motion compensation unit 34 depicted in FIG. 1. The CPU 112 executes the prediction error signal generation process 144, thus functioning as the prediction error signal generation unit 36 depicted in FIG. 1. The CPU 112 executes the orthogonal transform and quantization process 146, thus functioning as the orthogonal transform and quantization unit 38 depicted in FIG. 1. The CPU 112 executes the variable length encoding process 148, thus functioning as the variable length encoding unit 46 depicted in FIG. 1. The CPU 112 executes the inverse orthogonal transform and inverse quantization process 150, thus functioning as the inverse orthogonal transform and inverse quantization unit 40 depicted in FIG. 1. The CPU 112 executes the addition process 152, thus functioning as the addition unit 42 depicted in FIG. 1.

Here, part of a storage region of the memory 114 is used as the reference image storage unit 28 and the reference image storage unit 44. Accordingly, the computer 110 which executes the moving image reencoding program 120 functions as the moving image reencoding device 10. The case where the moving image reencoding program 120 is read from the storage unit 116 is illustrated in this example, but the moving image reencoding program 120 may be read from an arbitrary recording medium and be executed.

Several examples of statistical information for reencoding have been illustrated in the above description. Any one piece of statistical information among the several examples of statistical information may be used or a plurality of pieces of information or all pieces of information may be combined so as to perform condition determination.

Further, MPEG2 and H.264 are illustrated respectively as the first encoding method and the second encoding method in the above description. However, the technique of the present disclosure is not limited to this, and an arbitrary encoding method is applicable.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A device configured to reencode a moving image, comprising:
 a processor; and
 a memory which stores a plurality of instructions, which when executed by the processor, cause the processor to execute,
 decoding encoded moving image data that is encoded by a first encoding method that enables switching for a frame encoding mode in which encoding is performed on the basis of a frame or a field encoding mode in which encoding is performed on the basis of a field, in a unit of each of a plurality of blocks into which each of frames of the encoded moving image data is divided,
 acquiring importance degree information of an encoding mode that is switched in the unit of each of the plurality of blocks when decoding the encoded moving image data, the importance degree information relating to at least one of a ratio of the plurality of blocks that are encoded in the frame encoding mode and in the field encoding mode, and a degree of movement in each of the frames of the encoded moving image data;
 determining an encoding parameter that is set to a second encoding method, the second encoding method enabling switching for the frame encoding mode or the field encoding mode in a unit of each of the frames, the encoding parameter relating to a bit rate of the second encoding method for the decoded moving image data;
 determining an encoding mode of the second encoding method on the basis of the importance degree information that is acquired, and the encoding parameter that is determined, so that the field encoding mode has higher priority than the frame encoding mode as the bit rate to which the encoding parameter is related is lower and so that the frame encoding mode has higher priority than the field encoding mode as the bit rate to which the encoding parameter is related is higher; and performing the second encoding with respect to the moving image data that is decoded, in accordance with the encoding mode that is determined.

2. The device according to claim 1,
wherein in the acquiring importance degree information, encoding mode information indicating whether orthogonal transform is frame DCT or field DCT is acquired in a case of intra-frame encoding, and at least one of prediction mode information indicating whether motion prediction is frame prediction or field prediction and encoding mode information indicating whether orthogonal transform is frame DCT or field DCT is acquired in a case of inter-frame encoding, as the importance degree information.

3. The device according to claim 1,
wherein in the acquiring importance degree information, a value obtained by accumulating the number of blocks of at least one encoding mode of the field encoding mode and the frame encoding mode is acquired as the importance degree information, regarding the encoded moving image data that is encoded by the first encoding method, and
wherein in the determining the encoding mode of the second encoding method, the field encoding mode is selected as the encoding mode of the second encoding method when a cumulative value of the number of blocks of the field encoding mode is equal to or bigger than a threshold value TH1, and the frame encoding mode is selected as the encoding mode of the second encoding method when a cumulative value of the number of blocks of the field encoding mode is less than the threshold value TH1.

4. The device according to claim 1,
wherein in the acquiring importance degree information, a picture encoding generated information amount of at least one encoding mode of the field encoding mode and the frame encoding mode is acquired as the importance degree information, regarding the encoded moving image data that is encoded by the first encoding method, and
wherein in the determining the encoding mode of the second encoding method, a rate of a size of a picture encoding generated information amount of the field encoding with respect to a size of a picture encoding generated information amount of the frame encoding mode is obtained, the field encoding mode is selected as the encoding mode of the second encoding method when the rate obtained is equal to or bigger than a threshold value TH2, and the frame encoding mode is selected as the encoding mode of the second encoding method when the rate is less than the threshold value TH2.

5. The device according to claim 1,
wherein in the acquiring importance degree information, information indicating an average or dispersion of motion vectors in at least one encoding mode of the field encoding mode and the frame encoding mode is acquired as the importance degree information, regarding the encoded moving image data that is encoded by the first encoding method, and wherein in the determining the encoding mode of the second encoding method, a rate of a size of an average or dispersion of motion vectors of the field encoding mode with respect to a size of an average or dispersion of motion vectors of the frame encoding mode is obtained, the field encoding mode is selected as the encoding mode of the second encoding method when the rate obtained is equal to or bigger than a threshold, value TH3, and the frame encoding mode is selected as the encoding mode of the second encoding method when the rate is less than the threshold value TH3.

6. The device according to claim 3,
wherein in the determining the encoding mode of the second encoding method, a threshold value, the threshold value being used for determination, among the threshold values TH1 to TH3 is reduced, as the bit rate that is indicated by the information acquired decreases.

7. The device according to claim 3,
wherein in the determining the encoding mode of the second encoding method, a threshold value, the threshold value being used for determination, among the threshold values TH1 to TH3 is reduced, as the rate of the generated information amount of the I picture with respect to the generated information amount of all pictures, the rate being indicated by the information acquired, decreases.

8. The device according to claim 3,
wherein in the determining the encoding mode of the second encoding method, a threshold value, the threshold value being used for determination, among the threshold values TH1 to TH3 is reduced, as the average value of the quantization scales, the average value being indicated by the information acquired, increases.

9. A moving image reencoding method, comprising:
decoding encoded moving image data, by a computer processor, that is encoded by a first encoding method that enables switching for a frame encoding mode in which encoding is performed on the basis of a frame or a field encoding mode in which encoding is performed on the basis of a field, in a unit of each of a plurality of blocks into which each of frames of the encoded moving image data is divided, and acquiring importance degree information of an encoding mode that is switched in the unit of each of the plurality of blocks when decoding the encoded moving image data, the importance degree information relating to at least one of a ratio of the plurality of blocks that are encoded in the frame encoding mode and in the field encoding mode, and a degree of movement in each of the frames of the encoded moving image data;

determining an encoding parameter that is set to a second encoding method, the second encoding method enabling switching for the frame encoding mode or the field encoding mode in a unit of each of the frames, the encoding parameter relating to a bit rate of the second encoding method for the decoded moving image data;

determining an encoding mode of the second encoding method on the basis of the importance degree information that is acquired, and the encoding parameter that is determined, so that the field encoding mode has higher priority than the frame encoding mode as the bit rate to which the encoding parameter is related is lower and so that the frame encoding mode has higher priority than the field encoding mode as the bit rate to which the encoding parameter is related is higher; and performing the second encoding with respect to the moving image data that is decoded, in accordance with the encoding mode that is determined.

10. The method according to claim 9,
wherein in the acquiring importance degree information, encoding mode information indicating whether orthogonal transform is frame DCT or field DCT is acquired in a case of intra-frame encoding, and at least one of prediction mode information indicating whether motion prediction is frame prediction or field prediction and encoding mode information indicating whether orthogonal transform is frame DCT or field DCT is acquired in a case of inter-frame encoding, as the importance degree information.

11. The method according to claim 9,
wherein in the acquiring importance degree information, a value obtained by accumulating the number of blocks of at least one encoding mode of the field encoding mode and the frame encoding mode is acquired as the importance degree information, regarding the encoded moving image data that is encoded by the first encoding method, and
wherein in the determining the encoding mode of the second encoding method, the field encoding mode is selected as the encoding mode of the second encoding method when a cumulative value of the number of blocks of the field encoding mode is equal to or bigger than a threshold value TH1, and the frame encoding mode is selected as the encoding mode of the second encoding method when a cumulative value of the number of blocks of the field encoding mode is less than the threshold value TH1.

12. The method according to claim 9,
wherein in the acquiring importance degree information, a picture encoding generated information amount of at least one encoding mode of the field encoding mode and the frame encoding mode is acquired as the importance degree information, regarding the encoded moving image data that is encoded by the first encoding method, and
wherein in the determining the encoding mode of the second encoding method, a rate of a size of a picture encoding generated information amount of the field encoding with respect to a size of a picture encoding generated information amount of the frame encoding mode is obtained, the field encoding mode is selected as the encoding mode of the second encoding method when the rate obtained is equal to or bigger than a threshold value TH2, and the frame encoding mode is selected as the encoding mode of the second encoding method when the rate is less than the threshold value TH2.

13. The method according to claim 9,
wherein in the acquiring importance degree information, information indicating an average or dispersion of motion vectors in at least one encoding mode of the field encoding mode and the frame encoding mode is acquired as the importance degree information, regarding the encoded moving image data that is encoded by the first encoding method, and
wherein in the determining the encoding mode of the second encoding method, a rate of a size of an average or dispersion of motion vectors of the field encoding mode with respect to a size of an average or dispersion of motion vectors of the frame encoding mode is obtained, the field encoding mode is selected as the encoding mode of the second encoding method when the rate obtained is equal to or bigger than a threshold value TH3, and the frame encoding mode is selected as the encoding mode of the second encoding method when the rate is less than the threshold value TH3.

14. The method according to claim 11,
wherein in the determining the encoding mode of the second encoding method, a threshold value, the threshold value being used for determination, among the threshold values TH1 to TH3 is reduced, as the bit rate that is indicated by the information acquired decreases.

15. The method according to claim 11,
wherein in the determining the encoding mode of the second encoding method, threshold value, the threshold value being used for determination, among the threshold values TH1 to TH3 is reduced, as the rate of the generated information amount of the I picture with respect to the generated information amount of all pictures, the rate being indicated by the information acquired, decreases.

16. The method according to claim 11,
wherein in the determining the encoding mode of the second encoding method, a threshold value, the threshold value being used for determination, among the threshold values TH1 to TH3 is reduced, as the average value of the quantization scales, the average value being indicated by the information acquired, increases.

17. non-transitory computer-readable medium storing a moving image reencoding program that causes a computer to execute a process, comprising:
decoding encoded moving mage data that is encoded by a first encoding method that enables switching for a frame encoding mode in which encoding is performed on the basis of a frame or a field encoding mode in which encoding is performed on the basis of a field, in a unit of each of a plurality of blocks into which each of frames of the encoded moving image data is divided, and acquiring importance degree information of an encoding mode that is switched in the unit of each of the plurality of blocks when decoding the encoded moving image data, the importance degree information relating to at least one of a ratio of the plurality of blocks that are encoded in the frame encoding mode and in the field encoding mode, and a degree of movement in each of the frames of the encoded moving image data;
determining an encoding parameter that is set to a second encoding method, the second encoding method enabling switching for the frame encoding mode or the field encoding mode in a unit of each of the frames, the encoding parameter relating to a bit rate of the second encoding method for the decoded moving image data;
determining an encoding mode of the second encoding method or the basis of the importance degree information that is acquired, and the encoding parameter that is determined, so that the field encoding mode has higher priority than the frame encoding mode as the bit rate to which the encoding parameter is related is lower and so that the frame encoding mode has higher priority than the field encoding mode as the bit rate to which the encoding parameter is related is higher; and
performing the second encoding with respect to the moving image data that is decoded, in accordance with the encoding mode that is determined.

18. The moving image reencoding device according to claim 1, wherein the encoding parameter is a parameter of Group of Pictures (GOP) that is applied to the he second encoding method for the decoded moving image data.

19. The moving image reencoding device according to claim 1, wherein a threshold value is determined based on the encoding parameter, and the encoding mode of the second encoding method is determined based on whether the importance degree information is larger than the threshold or not.

* * * * *